(12) United States Patent
Keller

(10) Patent No.: US 6,748,970 B2
(45) Date of Patent: *Jun. 15, 2004

(54) PILOT OPERATED WATER CONSERVATION VALVE AND ACTUATOR

(76) Inventor: Myron Keller, P.O. Box 7468, Bonney Lake, WA (US) 98390

(*) Notice: Subject to any disclaimer, the term of this patent is extended or adjusted under 35 U.S.C. 154(b) by 0 days.

This patent is subject to a terminal disclaimer.

(21) Appl. No.: 09/973,519

(22) Filed: Oct. 9, 2001

(65) Prior Publication Data

US 2002/0046774 A1 Apr. 25, 2002

Related U.S. Application Data

(63) Continuation-in-part of application No. 09/452,754, filed on Dec. 1, 1999, now Pat. No. 6,298,872, which is a continuation-in-part of application No. 08/687,660, filed on Jul. 26, 1996, now Pat. No. 6,123,315.

(60) Provisional application No. 60/001,639, filed on Jul. 28, 1995.

(51) Int. Cl.⁷ ............................. F16K 37/00; E03C 1/02
(52) U.S. Cl. ..................... 137/360; 137/801; 251/41; 251/45; 251/90; 251/279
(58) Field of Search .............. 137/360; 251/41, 251/45, 90, 111, 279, 280

(56) References Cited

U.S. PATENT DOCUMENTS

| | | | | |
|---|---|---|---|---|
| 1,824,057 A | * | 9/1931 | Robertshaw et al. | 251/45 |
| 2,683,580 A | * | 7/1954 | Griswold | 251/45 |
| 2,686,034 A | | 8/1954 | Rabal | 251/41 |
| 3,536,294 A | * | 10/1970 | Rodriguez | 251/41 |
| 3,805,822 A | * | 4/1974 | Joannon | 137/390 |
| 4,058,287 A | * | 11/1977 | Fromfield | 251/46 |
| 4,819,682 A | * | 4/1989 | Marcke | 137/1 |
| 5,095,941 A | * | 3/1992 | Betz | 137/552 |
| 5,131,622 A | * | 7/1992 | Chang | 251/43 |
| 5,230,365 A | * | 7/1993 | Woltz et al. | 137/607 |
| 5,263,684 A | | 11/1993 | McGuire | 251/294 |
| 5,307,837 A | | 5/1994 | Woltz et al. | 137/607 |
| 5,386,600 A | * | 2/1995 | Gilbert, Sr. | 4/677 |
| 5,505,227 A | | 4/1996 | Pubben | 137/607 |
| 5,511,763 A | | 4/1996 | Green | 251/129.02 |

FOREIGN PATENT DOCUMENTS

| | | | | |
|---|---|---|---|---|
| GB | 4397 | of 1913 | | 251/41 |
| GB | 666068 | 2/1952 | | 251/41 |
| IL | 35178 | 8/1970 | | |
| IL | 104235 | 12/1992 | | |

* cited by examiner

Primary Examiner—A. Michael Chambers
(74) Attorney, Agent, or Firm—R. Reams Goodloe, Jr.

(57) ABSTRACT

A fluid diaphragm valve and interconnected pilot valve apparatus for control flow of fluid discharge from a pressurized fluid distribution system. The apparatus has a primary valve with an inlet adapted to receive fluid under pressure, and an outlet adapted to discharge fluid to an outlet conduit. A diaphragm chamber is provided in the primary valve that is responsive to fluid pressure controlled by a pilot diaphragm valve. Upon release of fluid pressure in the pilot diaphragm valve, the primary valve allows passage of fluid to the outlet conduit. Bleed fluid from the pilot valve is also discharged into the outlet conduit and is thus saved for use. Upon closure of the pilot valve, a bleed port in the primary diaphragm in the primary valve allows repressurization and seating of the primary diaphragm, thus terminating fluid flow through the primary valve. A novel, retrograde motion actuator is also described for use in manual operation of the pilot valve from a fixed location such as cabinets below kitchen sinks.

13 Claims, 18 Drawing Sheets

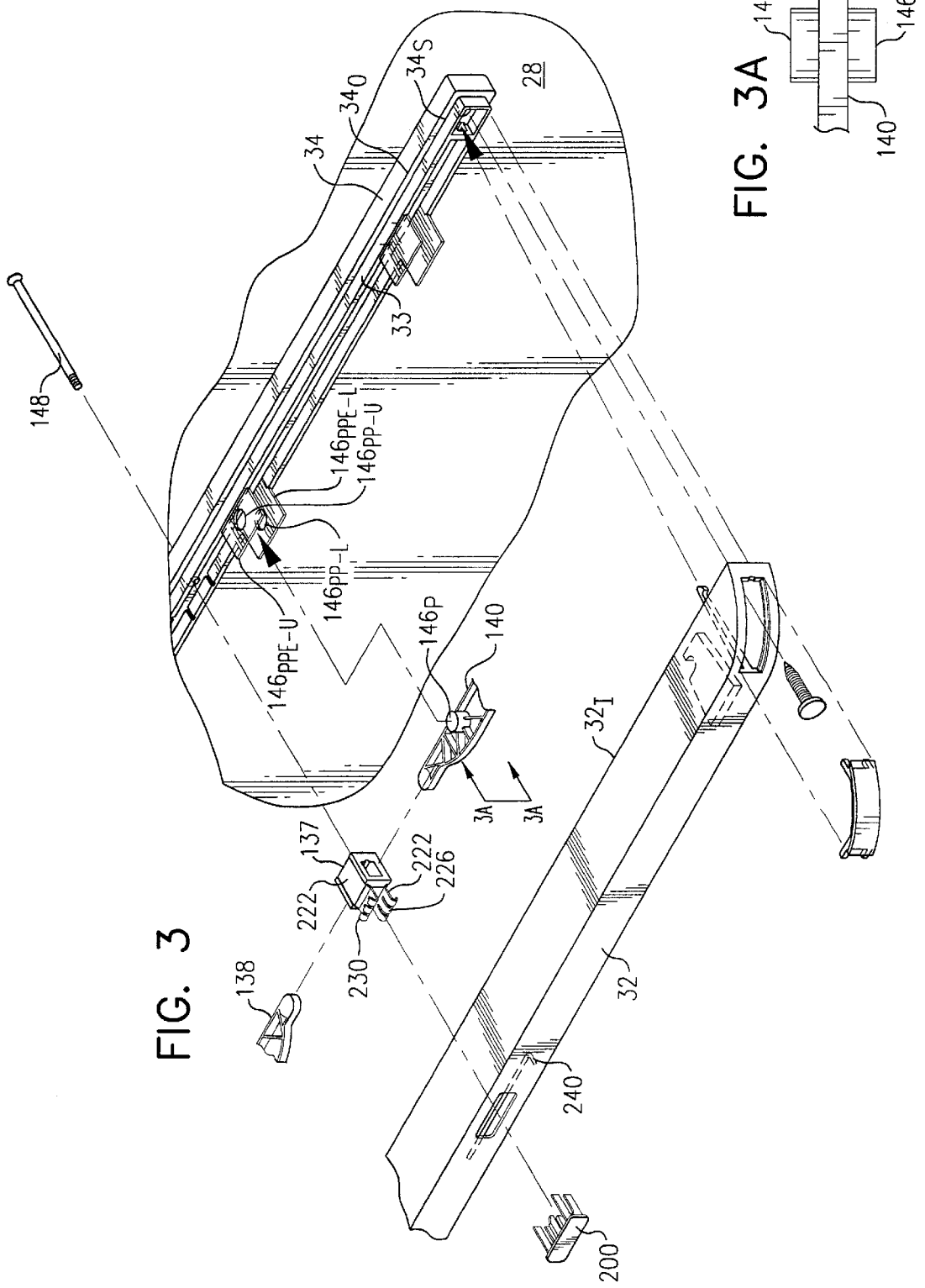

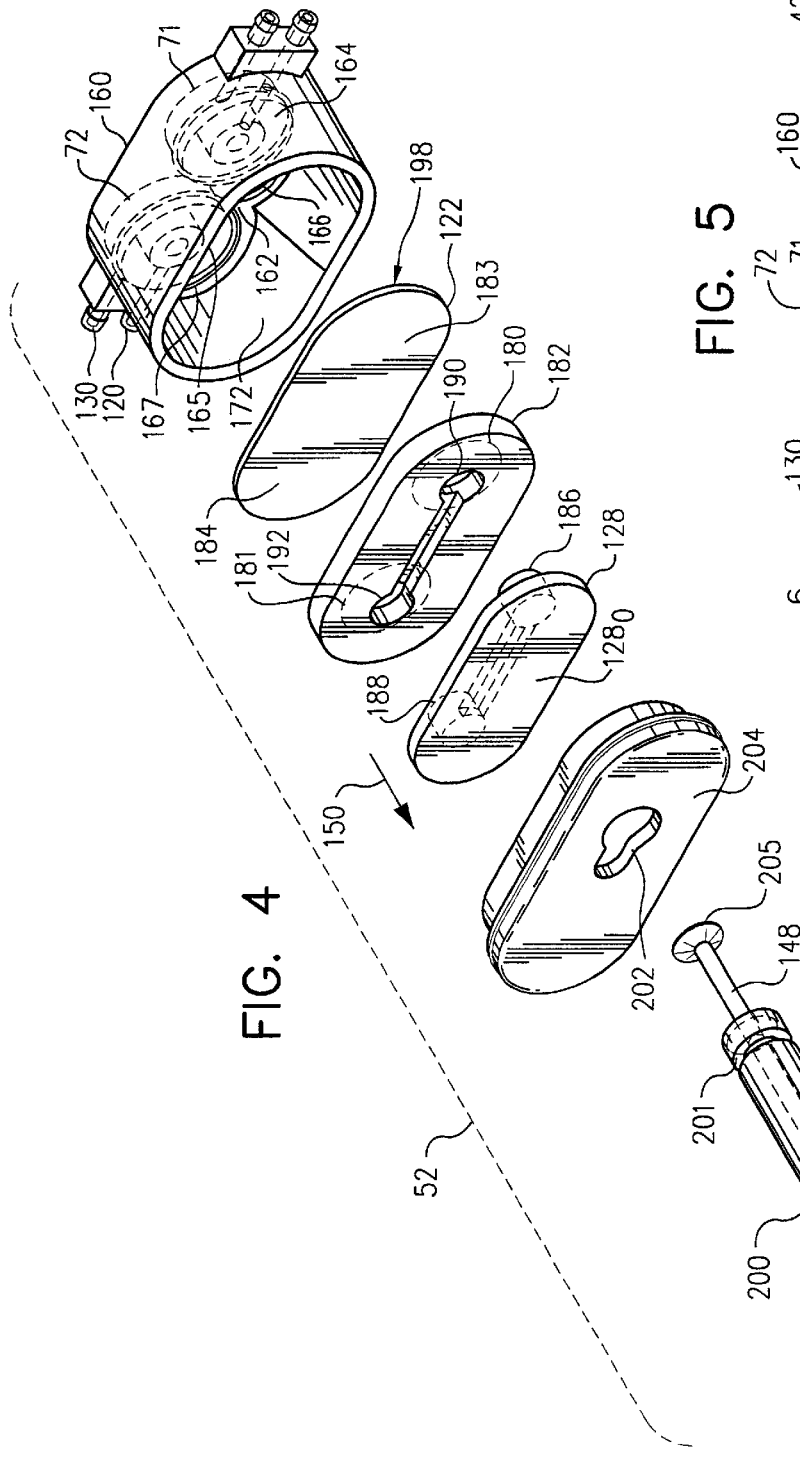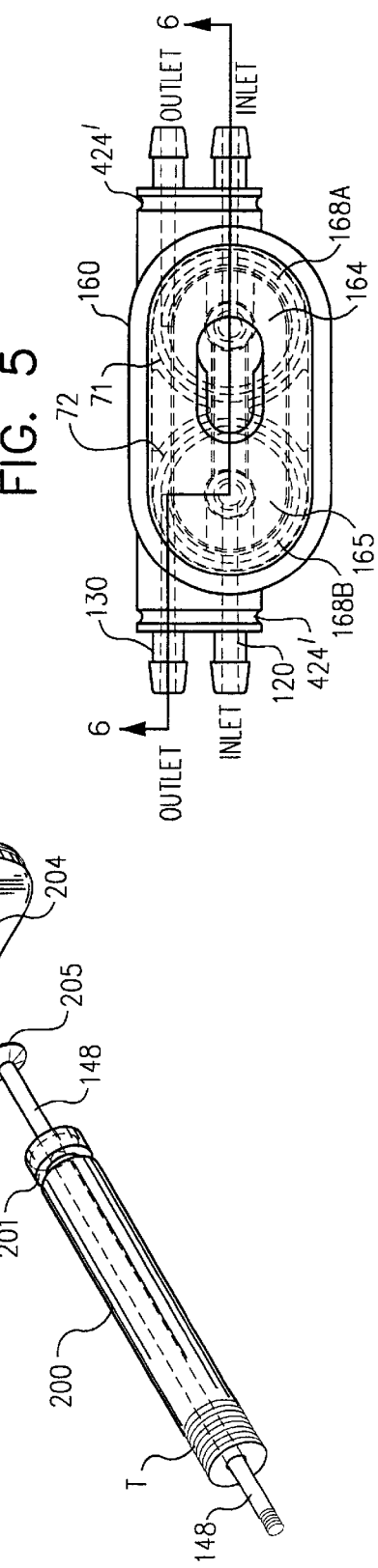

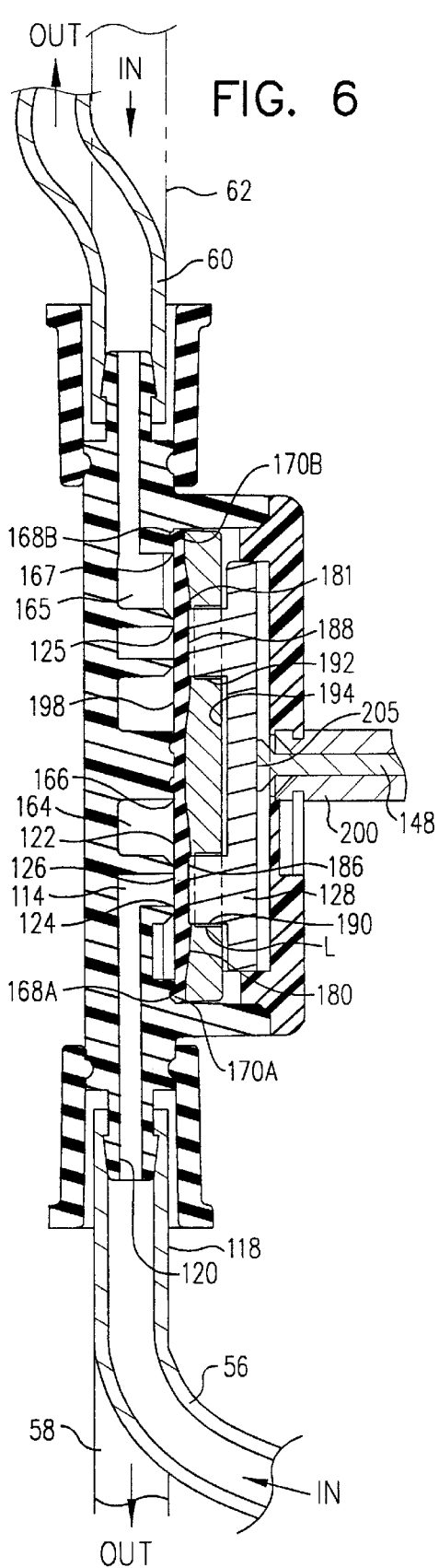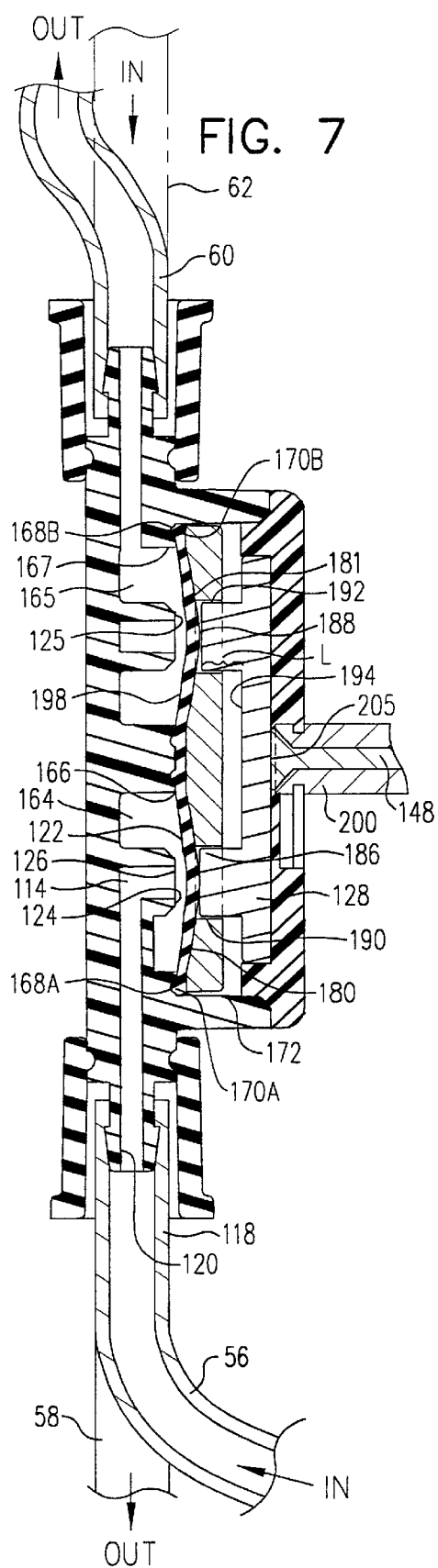

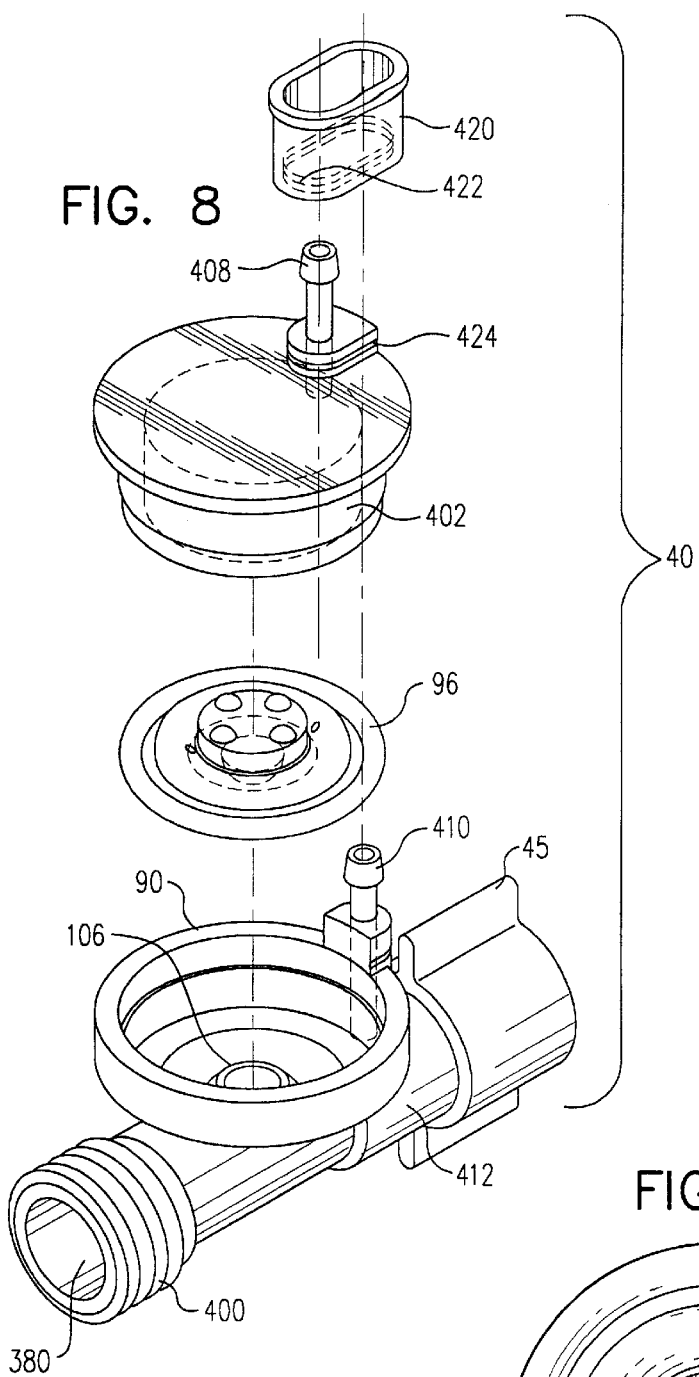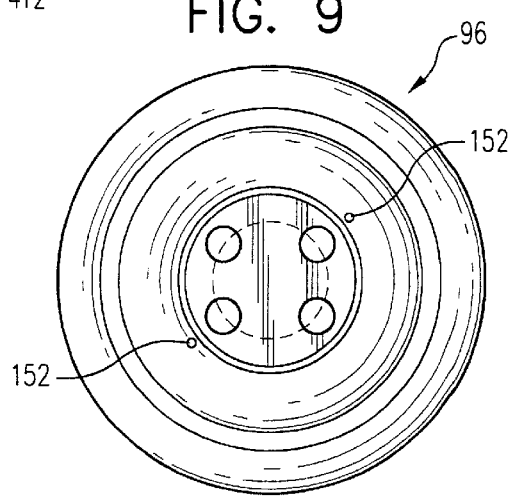

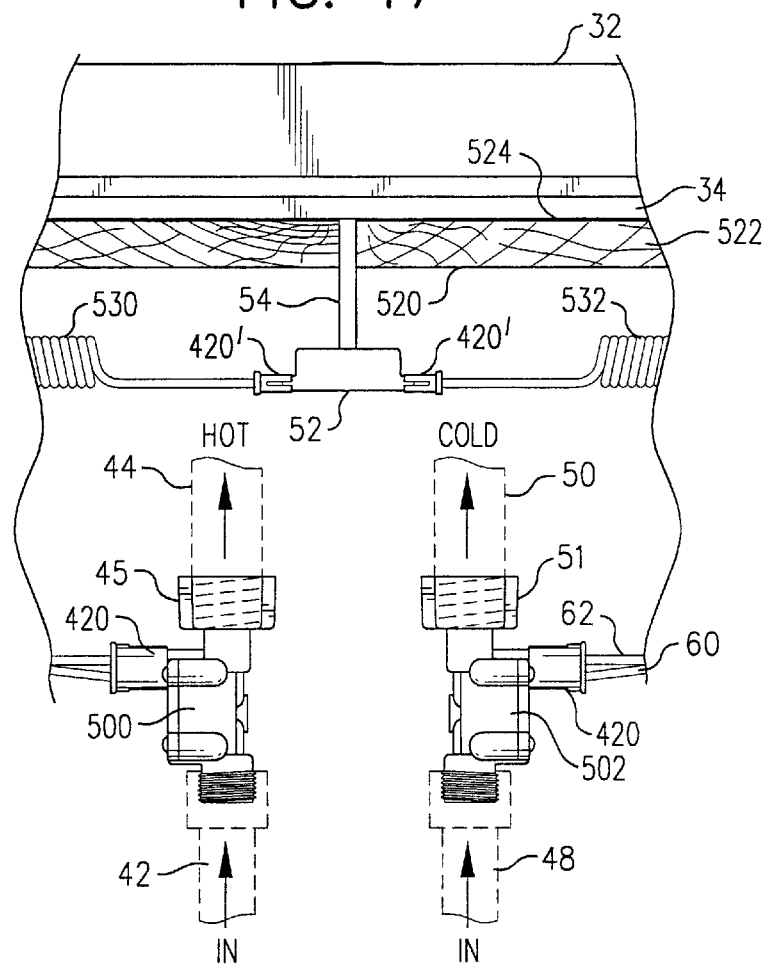
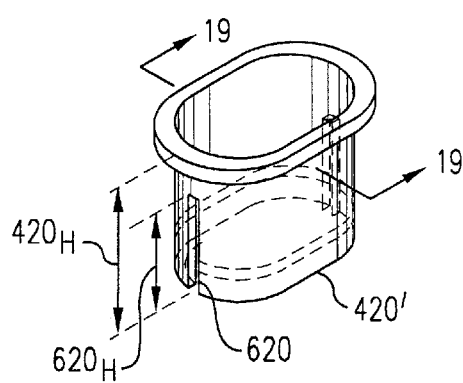
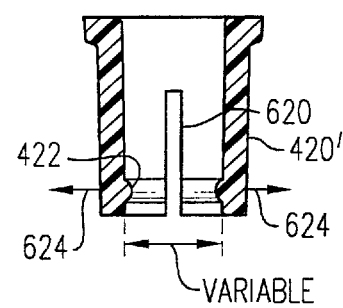
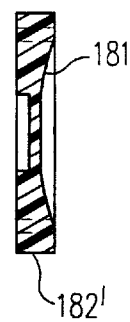

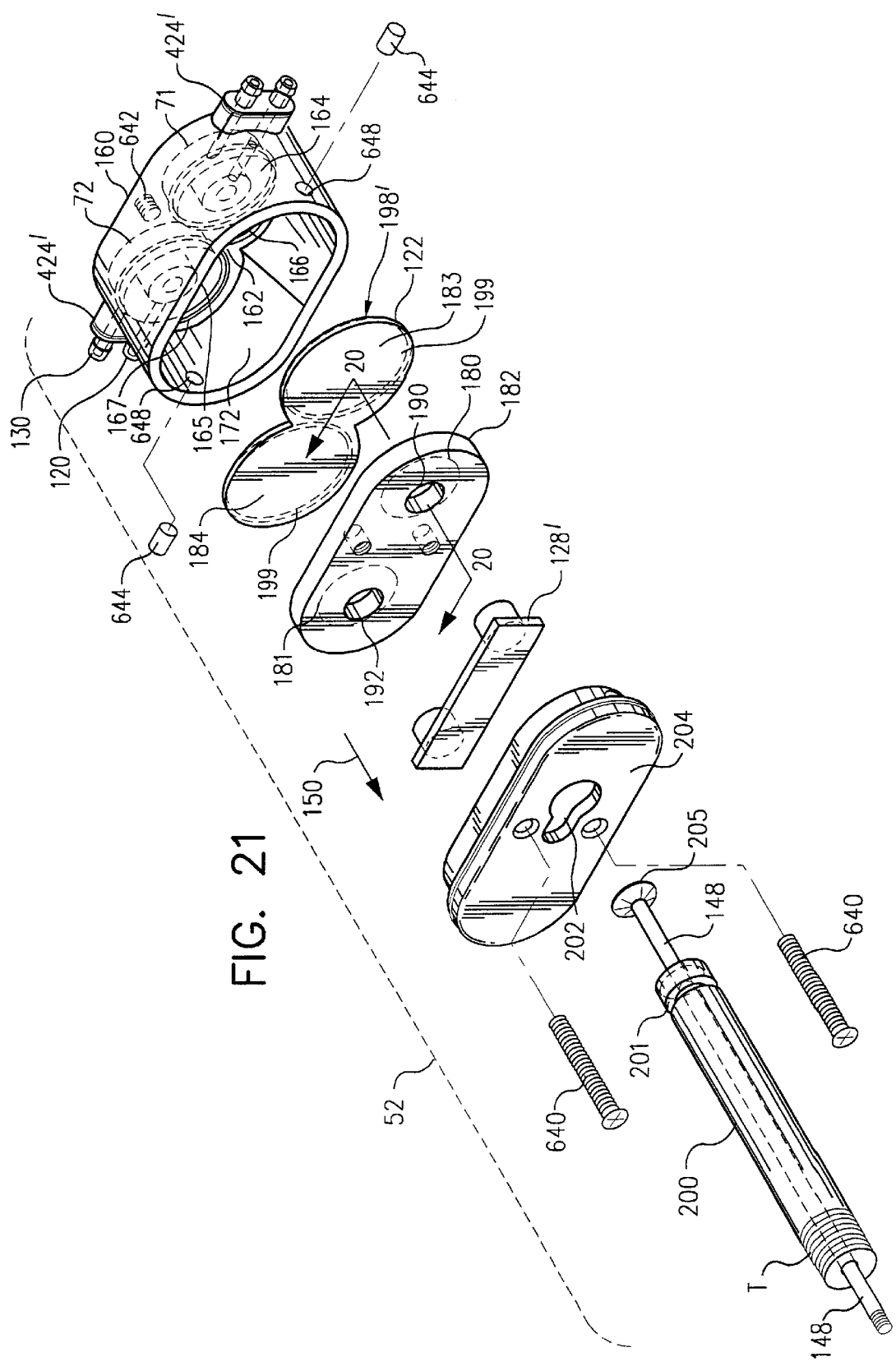

PILOT OPERATED WATER CONSERVATION VALVE AND ACTUATOR

RELATED PATENT APPLICATIONS

This non-provisional patent application, is a continuation-in-part (CIP2) of application Ser. No. 09/452,754 filed on Dec. 1, 1999, now U.S. Pat. No. 6,298,872 issued on Oct. 9, 2001, which application was a continuation-in-part (CIP) and claimed the benefit under 35 USC §120 of Ser. No. 08/687,660 filed Jul. 26, 1996, now U.S. Pat. No. 6,123,315, issued on Sep. 26, 2000, which claimed priority under 35 USC §119 (e) from U.S. Provisional Application Serial No. 60/001,639 filed Jul. 28, 1995.

TECHNICAL FIELD

The apparatus disclosed relates to a hands free apparatus for controlling water discharge operations which is adapted to minimize water usage at taps such as kitchen and bathroom sinks, whether residential or industrial, and more particularly, to optimum design features for such apparatus.

BACKGROUND

As a result of either water costs or shortages, it is often desirable to reduce the amount of water consumed at a point of use, such as at a tap supplying water to a household kitchen sink. Typically, the actual amount of water required to accomplish the task at hand is relatively small compared to the amount of water that is inadvertently wasted while the user's attention is directed elsewhere. For example, it is often inconvenient to shut off the water flow between rinsing separate utensils, or while cutting a freshly rinsed vegetable. Or, handling faucets when cutting raw meat may inadvertently contaminate the controls with bacteria, such as virulent stains of E. coli, and is best avoided by leaving rinse water running during meat cutting operations, to avoid health code violations in institutional or commercial kitchen settings. While the economic cost of such wasteful practices has only begun to reach the pocketbooks of individual consumers, collectively, society has begun to encounter the cost of such practices in many ways. For example, it has become common in certain areas to hear of the denial of water availability certifications that are required before beginning construction of new homes. Also, consumptive water uses have reduced in-stream flows, have contributed to the decline of fish populations, and also have adversely impacted the recreational use of certain lakes and rivers that are used for water supply.

Nevertheless, although diaphragm type valves have long been known, the special design necessary to adapt such devices to regulate tap water flow has not been exploited heretofore by others. Thus, the advantages offered the disclosed hydraulically actuated, unique diaphragm valve design, and its avoidance of electrical or mechanical linkages as a prerequisite to actuate a water flow valve, are important and self-evident.

KEY ASPECTS OF THE DISCLOSED APPARATUS AND METHOD

A novel pilot controlled water flow control valve and accompanying actuator bar is disclosed which does not have the drawbacks common to those somewhat similar products heretofore designed or used. Unlike the earlier designs that attempted to provide a mechanical or electrical linkage for use in opening and closing a valve, an exemplary design is provided that includes a simple means for opening and closing the valve, without resorting to either electrical or mechanical components. Further, it is simple to use, easy to install, and otherwise superior to those designs heretofore used or proposed. In addition, it provides significant reduction in water consumption in systems that utilize the device.

From the foregoing, it will be apparent to the reader that one important and primary object the apparatus disclosed resides in the provision of a novel pilot valve actuated water valve apparatus for reducing the consumption of water in regulated water taps, and which improves the reliability, simplicity and safety of such types of devices by reducing or eliminating reliance on electrical wiring or extensive mechanically linked parts.

Other important but more specific objects of the apparatus disclosed reside in (1) the provision of an apparatus for reducing the consumption of water at discharge taps, and (2) the provision of a method for reducing the flow of water at discharge taps, using the apparatus described herein which:

can easily and quickly installed by an unsophisticated user in existing, conventional, manually operated household kitchen and bathroom sinks;

which in a relatively inexpensive manner can reduce water consumption at such kitchen and bathroom sinks;

which can easily and quickly be installed in institutional or commercial kitchens to enable employees to engage in hands-off water faucet operation, thereby reducing cross-contamination between raw foods and finished products, and thus insuring that health codes can be easily complied with during normal operations.

Other important objects, features, and additional advantages of the disclosed apparatus will become apparent to the reader from the foregoing and from the appended claims and as the ensuing detailed description and discussion proceeds in conjunction with the accompanying drawing.

SUMMARY

A novel pilot operated valve apparatus for controlling the discharge of fluids, and in particular for controlling the discharge of water from a pressurized water supply system, is provided. The valve apparatus is particularly useful for minimizing the amount of water used at industrial, commercial, and household kitchen sinks.

The novel valve apparatus is advantageously utilized for control flow of fluid discharge from a pressurized fluid distribution system, such as those systems configured with the valve apparatus being supplied with fluid via an incoming conduit that supplies the fluid under pressure. The valve apparatus includes a primary valve, a pilot valve, and an actuator that is linked to the pilot valve. The primary valve has an inlet adapted to receive fluid under pressure from an incoming conduit, an outlet adapted to discharge the fluid to an outlet conduit, a diaphragm chamber having a pilot portion and a working portion, and a fluid pressure controlled primary diaphragm. The primary diaphragm is located in the primary diaphragm chamber between the pilot portion and the working portion of the primary diaphragm chamber. The primary diaphragm has a pilot side and a working side. The working side of the primary diaphragm is configured to engage at least a portion of the inlet, as well as the outlet. The primary diaphragm is adapted to be responsive to fluid pressure to move between (a) an open position wherein fluid pressure from the inlet disengages the primary diaphragm from the outlet so that fluid is allowed from the inlet to the outlet and thence to the outlet conduit, and (b) a closed position, wherein fluid pressure on the pilot side of the primary diaphragm forces the primary diaphragm to sealingly engage the outlet so that fluid is not allowed from the inlet to the outlet. To release fluid pressure so as to operate the valve, a bleed inlet line from the primary valve is provided operatively connected to a pilot valve. The bleed inlet line has a first end and a second end, with the first end hydraulically connected to the pilot portion of the primary diaphragm chamber. The pilot valve has a bleed inlet which is hydraulically connected to the second end of the bleed inlet line from the pilot portion of the diaphragm chamber. Also, the pilot valve has a bleed outlet for discharge of the bleed fluid, and a pressurizable fluid reservoir located between the bleed inlet and the bleed outlet. The fluid reservoir is adapted to receive pressurized liquid from the bleed inlet line. The pilot valve is operated using a plunger to displace a repositionable pilot diaphragm between (a) a normally closed position wherein the repositionable pilot diaphragm sealingly engages the bleed outlet to block escape of said pressurized fluid through the pilot valve, and (b) an open position, wherein the repositionable pilot diaphragm is displaced from the bleed outlet so as to hydraulically open the bleed outlet for passage of fluid therethrough. In the open position, pressurized fluid from the pilot side of the primary diaphragm chamber is discharged through the pilot valve, relieving pressure on the diaphragm. An actuator, operatively linked to the pilot valve, is provided to enable the pilot valve to be opened and closed by manipulation of the actuator. The actuator has an open position and an inwardly directed normally closed position. The pilot valve is responsive to movement of the actuator, so that upon inwardly moving the actuator to the open position, the operating link causes the plunger of the pilot valve to reposition the pilot valve diaphragm from a normally closed position to an open position, thereby effecting the release of pressurized fluid out the bleed outlet and releasing fluid pressure on the pilot side of the primary diaphragm, to thereby allowing the primary diaphragm to move to the open position, and thus allowing the full fluid stream from the inlet conduit to flow through the primary valve.

The novel valve apparatus provides a simple device for minimizing water use in regulatable taps. This design provides a significant improvement in the art by reducing complexity compared to previous designs known to me for regulating or minimizing flow of liquid at point of use type devices such as institutional, commercial, and residential kitchen and bathroom sinks.

BRIEF DESCRIPTION OF DRAWING

FIG. 3 is a partial perspective view of one embodiment of the improved valve, showing a mounting bar and a close fitting actuator push bar, and including smoothly radiused push bar ends having a snap-fit access cover which allows access to mounting screw locations, a front "lock-on" button, and also showing the centrally mounted moving pivot block, and pivot points for the pivot arms.

FIG. 4 is an exploded perspective view of a dual pilot valve, showing the various elements of the pilot valve, including the main body, the diaphragm, the diaphragm seat, plunger, and outer housing with key lock for actuator pin.

FIG. 5 is a side elevation view, showing the dual pilot valve, and showing in hidden lines, the fluid inlet and outlet conduits; also illustrated are the snap-on retainers for protecting the barbed inlet and outlet conduit lines.

FIG. 6 is a cross-sectional view of the pilot valve in the closed, no-flow position.

FIG. 7 is a cross-sectional view of a pilot in the open, flow position.

FIG. 8 is an exploded perspective view of a main valve for controlling water flow, showing the various elements of the valve including the main body, the diaphragm, the diaphragm seat, upper housing, and inlet and outlet conduits to the pilot valve, and a snap-on protector for the barbed conduit connectors.

FIG. 9 is a top view of the diaphragm for a main valve, showing the integral weep holes, upper cushioning stop knobs, and the outer securing ring.

FIGS. 13 and 14 shows a cross-sectional view of an actuator push bar, and including the internal assembly components of the actuator bar, showing the actuator bar, pivot pins, pivot bars, the pivot block, and pilot valve interconnection, as well as the lock-on button for the actuator and related components.

In FIG. 13, the actuator bar is shown in the closed, no-flow position.

In FIG. 14, the actuator bar is shown in the open, liquid-flow position.

In FIGS. 15 and 1, a partial cut-away cross-sectional view shows the internal assembly in an actuation bar, as well as the manual lock-on button tab, In FIG. 15, the actuator bar is illustrated in the outward, closed, no-flow position.

In FIG. 16, the actuator bar is illustrated in the inward, open, liquid-flow position, with the manual lock-on tab engaged in the on, liquid flow-position.

FIG. 17 is a view of the improved valve apparatus, similar to FIG. 2 and likewise showing one layout of the operational elements, including the use of a primary regulating valve on both hot and cold water lines, and a single housing for a dual pilot valve which is positioned adjacent to the front cabin et mounted actuation push bar, and coiled expandable flexible interconnecting lines for valve actuation, and showing the use snap on type barb shrouds for protection of hose fitting points.

FIG. 18 is a perspective view of a removable barb shroud having a compressive lip for affixing the shroud to a base on a valve body.

FIG. 19 is a vertical cross-sectional view of a valve body, taken across line 19—19 of FIG. 18, showing the lower compressive lip used to affix the barb shroud to a base.

FIG. 20 is a vertical cross-sectional view of a retainer within an actuator valve, taken across line 20—20 of FIG. 21, showing cymbal shaped recesses for accepting a diaphram during valve operation.

FIG. 21 is an exploded perspective view of yet another embodiment of a dual pilot valve, similar to the valve first shown in FIG. 4, showing internal components and assembly details of the pilot valve, including the main body, the diaphragm seat, the diaphragm with sealing lip, retainer, plunger, and outer housing cover with key lock for an actuator pin, as well as secure closure devices, including fasteners and/or pins.

In FIG. 26, a cross-sectional view is provided that illustrates the actuator in the closed, no-flow position.

In FIG. 27, a cross-sectional view is provided that shows the actuator in the inward, fluid flow position.

In FIG. 28, a perspective view is provided, showing the relative size of a user's fingers and one embodiment of a suitable manual lock-on switch tab for the actuator, and also showing the embodiment of the spring mechanism that was just shown in FIGS. 26 and 27.

Figure 1:
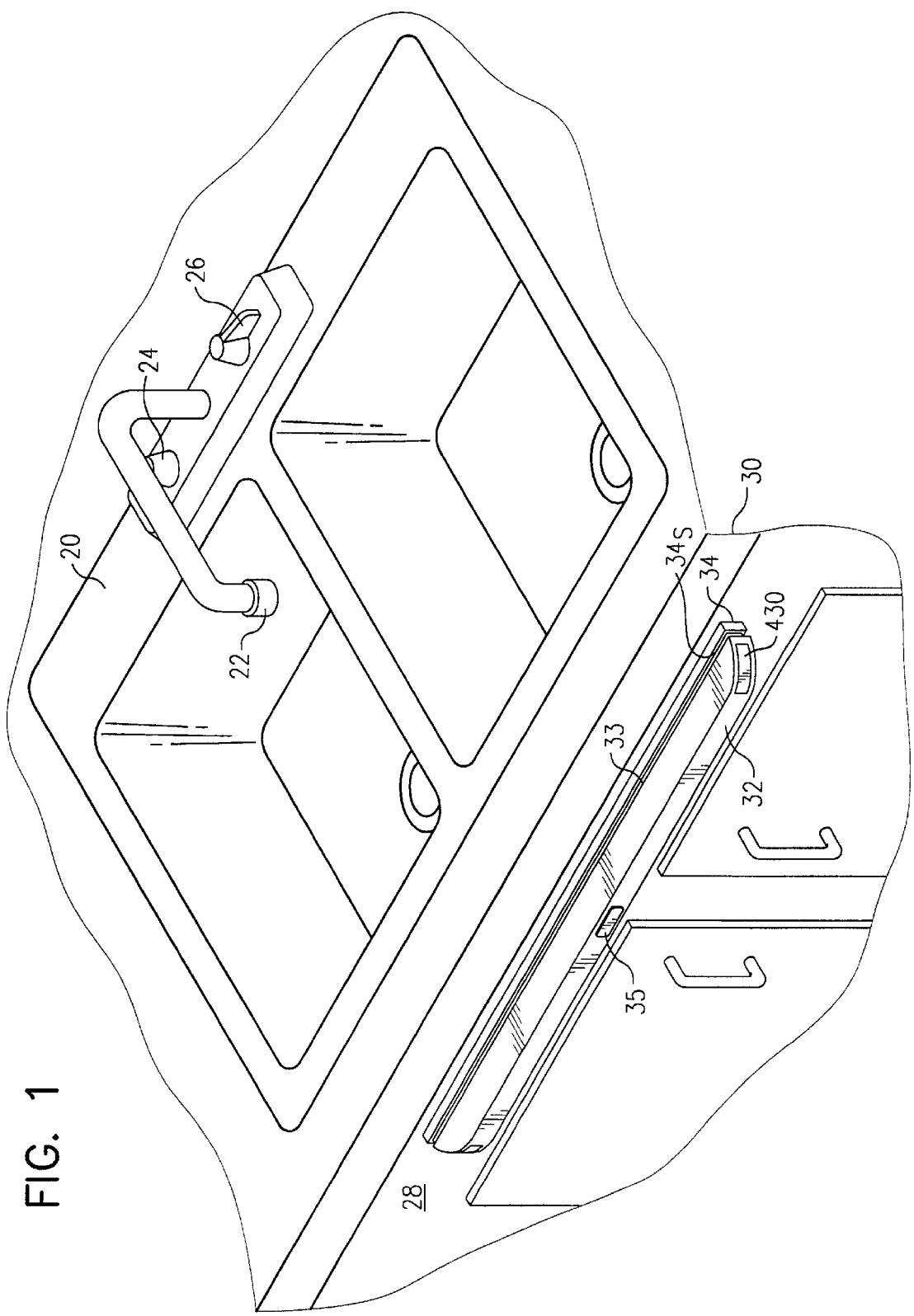
FIG. 1 is a perspective view of a kitchen sink and the front of a cabinet adjacent thereto, showing an actuation push bar without pinch point as utilized in one disclosed embodiment.

In the various figures, similar parts may be indicated by using the same reference numerals, or with a suffix of one or more prime symbols (', or ", for example), without further mention thereof, and it is to be understood that the latter described embodiments can be referred to with the same name as the initially described part which does not utilize such suffix.

The foregoing figures, being merely exemplary, contain various elements that may be present or omitted from actual implementations depending upon the circumstances. An attempt has been made to draw the figures in a way that illustrates at least those elements that are significant for an understanding of the various embodiments and aspects of the invention. However, various other elements of the water conservation valve and actuator apparatus are also shown and briefly described to enable the reader to understand how various optional features may be utilized in order to provide an efficient, actuator and pilot operated water conservation valve.

DESCRIPTION

Attention is directed to FIG. 1 of the drawing, where a typical kitchen sink 20 with tap 22 having typical hot 24 and cold 26 manual control valves is depicted. At the front 28 of cabinet 30, an actuator push bar 32 with mount housing 34 is shown. Also, a centrally located manual lock-on tab switch 35 is provided in the actuator push bar 32. Basically, this FIG. 1 depicts the external appearance of the valve apparatus 36 when installed; the major components of which are illustrated in FIG. 2.

Figure 2:
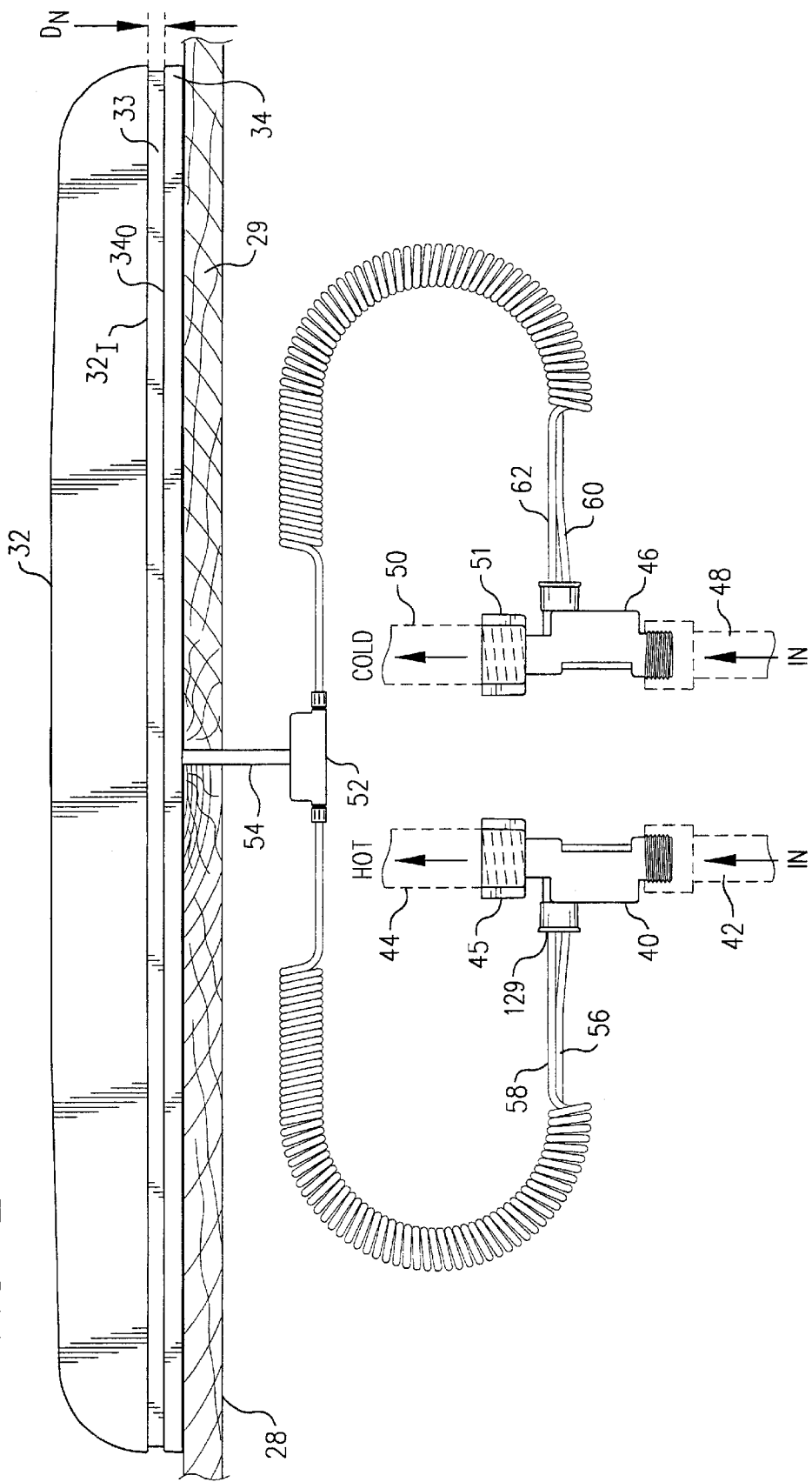
FIG. 2 is a view of the improved valve apparatus, showing a layout of the operational elements, including the use of a primary regulating valve on both hot and cold water lines, and a single housing for a dual pilot valve which is positioned adjacent to the front cabinet mounted actuation push bar, and coiled expandable flexible interconnecting lines for valve actuation.

Turning to FIG. 2, a hot water primary or main valve 40 is shown installed between hot water inlet conduit 42 and hot water outlet conduit 44, to which it is preferably affixed by use of hot water line wingnut 45 on connector fitting 82. Likewise, cold water primary or main valve 46 is shown installed between cold water inlet conduit 48 and cold water outlet conduit 50, to which it is preferably affixed by use of cold water wingnut fitting 51. A dual pilot valve 52 is mounted adjacent linkage 54 with actuator push bar 32. The dual pilot valve 52 is configured to serve both the hot water primary valve 40 and the cold water primary valve 46. The dual pilot valve 52 is connected to a hot water bleed inlet line 56 and a hot water bleed outlet line 58, both of which are more easily seen at the hot water primary valve 40, since, as illustrated in FIG. 2, one of these lines is hidden behind the other at the pilot valve 52. Similarly, the dual pilot valve 52 is connected to a cold water bleed inlet line 60 and cold water bleed outlet line 62, both of which are more easily seen at the cold water primary valve 46, since, as illustrated in this FIG. 2, one of these lines is hidden behind the other at the pilot valve 52.

Figure 10:
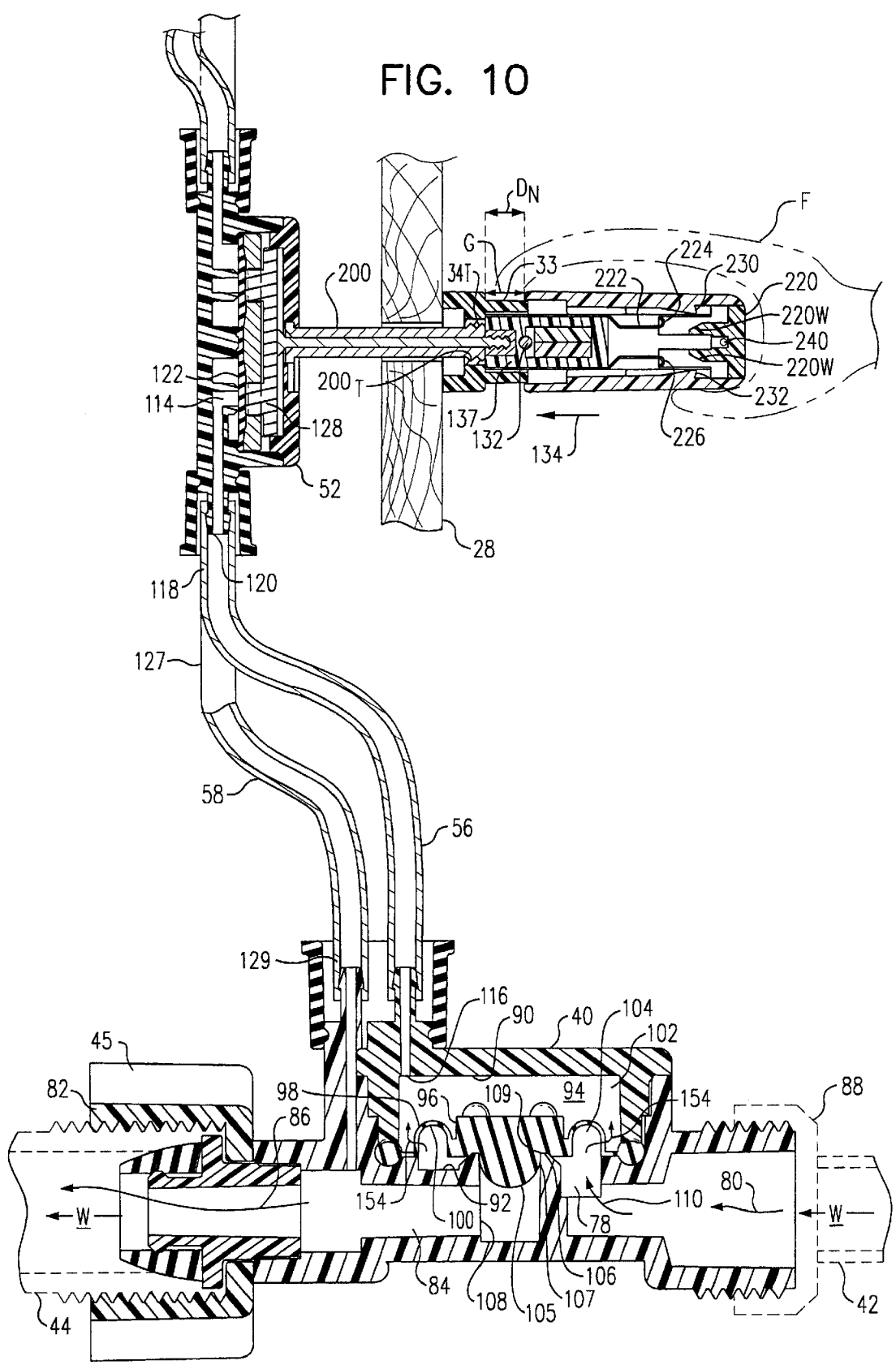
FIG. 10 is a cross-sectional view of key operating elements of an exemplary apparatus, showing a single primary valve and a dual pilot valve for regulating the discharge of water from at least one pressurized inlet conduit, with the pilot valve and the primary valve shown in the closed, no-flow position, so that no liquid flows through the primary valve.
Figure 11:
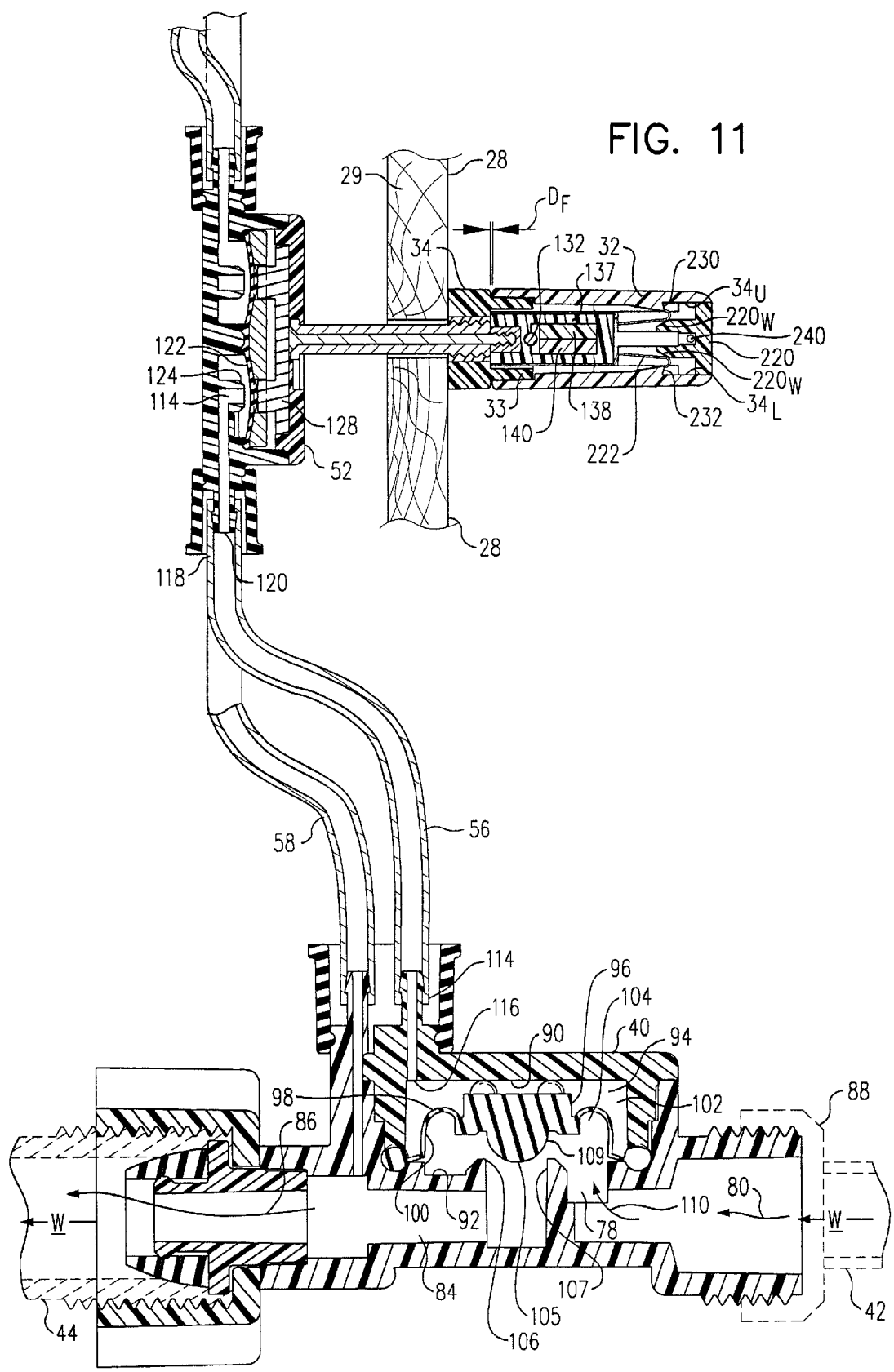
FIG. 11 is a cross-section view of the key operating elements of an exemplary embodiment, showing a single primary valve and a dual pilot valve for regulating the discharge of water from at least one pressurized inlet conduit, with the pilot valve and the primary valve shown in the open, fluid-flow position, so that liquid flows through the primary valve to a discharge outlet; the view also shows the flexible primary diaphragm.

Many important structural and functional details of an exemplary valve apparatus can be easily seen in FIGS. 10 and 11, where the operation of the valve apparatus is depicted using the dual pilot valve 52 a and single primary valve, namely hot water primary valve 40 (operation with the other valve, cold primary valve 46, is similar). As shown in FIG. 10, the hot primary valve 40 and pilot valve 52 are in the closed position, so that no fluid from inlet conduit 42 is allowed to pass through valve 40 to the outlet conduit 44. FIG. 11 shows the same primary valve 40 and pilot valve 52 in the open position, where fluid W from inlet conduit 42 is allowed to pass through valve 40 to the outlet conduit 44.

Figure 12:
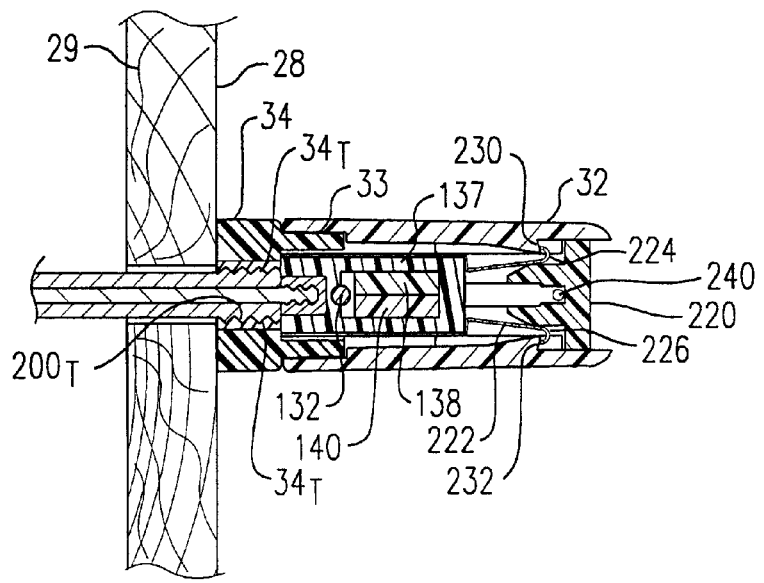
FIG. 12 is a cross-sectional view of a flush mount, no pinch point type actuation push bar in its operative position, shown in the engaged, water flow position wherein the push bar is engaged toward the cabinet face.
Figure 28:
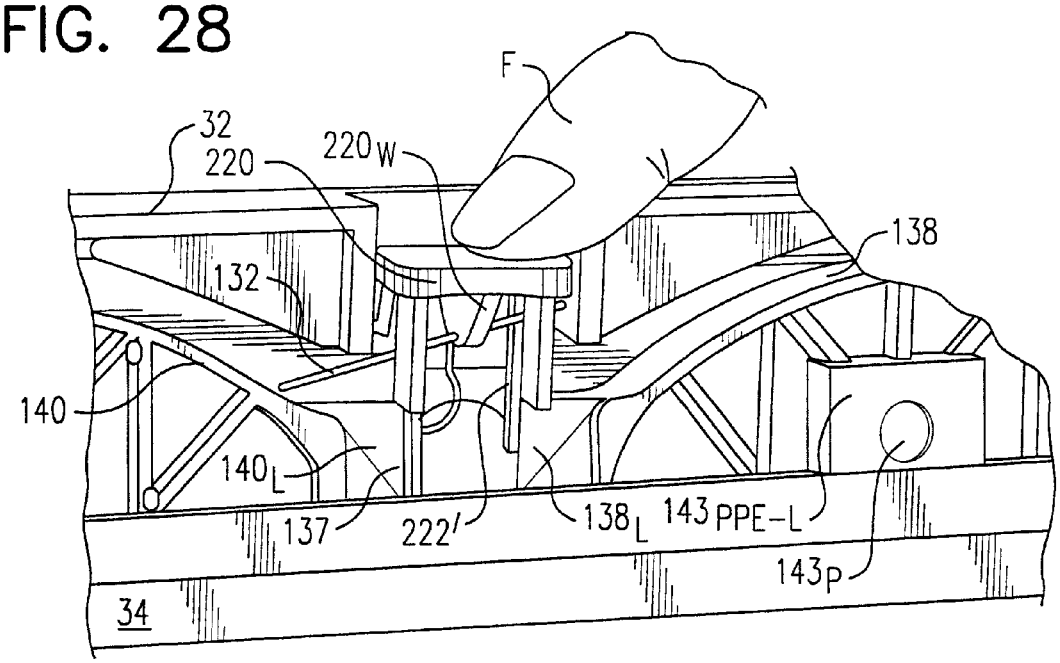
FIGS. 26, 27, and 28 are closely related views, similar to the views shown in FIGS. 15 and 16 above, now showing another embodiment for the spring used in the manual tab switch mechanism. In these figures, an internal view of an actuator push bar is provided, showing the internal assembly components of an actuator bar, including the pivot bars, the pivot block, and the linkage to the pilot, as well as the manual lock-on button switch tab for the actuator and related spring mechanism components.

The method via which the primary valve 40 is maintained in the closed position can be better understood by analysis of the key structural elements of the novel valve apparatus and the interrelationship as seen in these FIGS. 10 and 12. The primary valve 40 has an inlet space 78 that is adapted to receive incoming fluid as indicated by reference arrow 80 from the incoming conduit 42. For convenience, an integrally provided threaded connector 82 may be utilized to join valve 40 with outgoing conduit 44. An outlet space 84 is provided to discharge the fluid, as indicated by reference arrow 86, to outlet conduit 44. For convenience, a threaded connector 88 may be utilized to join incoming conduit 42 to primary valve 40, however, this is optional.

Diaphragm housing 90 and body 92 of primary valve 40 combine to form therebetween a diaphragm chamber 94. The diaphragm chamber 94 houses a fluid pressure controlled primary diaphragm 96. The primary diaphragm 96 has a pilot side 98 and a working side 100, to divide the diaphragm chamber into a pilot portion 102 and a working portion 104. The working side 100 of the primary diaphragm 96 has a protruding nipple portion 105 that is configured to sealingly engage a seat 106 at the upstream end 108 of outlet space 84. The rounded, protruding shape of nipple portion 105 is important, since such a shape allows a gradual closing of the outlet seal at seat 106, to thereby eliminate the "water hammer" phenomenon which would otherwise result from sudden stoppage of a fluid stream that is rushing towards the outlet 84 of valve 40. In this regard, the exact surface shape 107 of seat 106 may be varied to work in concert with the shape of nipple portion 105 to achieve the desired smoothly closing effect. As provided, the inside surface 107 of seat 106 is substantially parallel to the sidewall 109 (see FIG. 11) of nipple 105 when diaphragm 96 is at the closed position shown in FIG. 10. Thus, as the diaphragm 96 closes, an increasingly thin annular outlet is provided for liquid to escape to outlet 84 of valve 40. This decreasing cross-sectional flow area allows a smooth water cut-off to be achieved.

Also, the primary diaphragm 96 engages and interacts with fluid (as indicated by reference arrows 110) from at least a portion of inlet 78. The primary diaphragm 96 is made of a long lasting flexible material, such as a rubber or other suitable flexible elastomeric composition, and is suitable to be responsive to fluid pressure to move between (a) a closed position, wherein fluid pressure on the pilot side 98 of the primary diaphragm 96 forces the primary diaphragm to sealingly engage the seat 106 of outlet 84 so that fluid 80 is not allowed from the inlet space 78 to the outlet 84, and (b) an open position, as shown in FIG. 11, wherein fluid pressure on the pilot side 98 is comparatively reduced to allow fluid pressure from the inlet space 78 to disengage the primary diaphragm 96 from seat 106 of the outlet 84 so that fluid 80 is allowed from the inlet space 78 to the outlet 84 and thence to outlet conduit 44 as indicated by reference numeral 86.

To operate the flexible primary diaphragm 96, a bleed inlet line 56 is provided to hydraulically connect a pressurizable fluid reservoir 114 in pilot valve 52 with the diaphragm chamber 94 in the primary valve 40. The bleed inlet line 56 has a first end 114 hydraulically connected via outlet port 116 to the pilot portion 102 of diaphragm chamber 94, and a second end 118 hydraulically connected to bleed inlet 120 of the fluid reservoir 114 in pilot valve 72. The pressurizable fluid reservoir 114 is adapted to receive pressurized liquid, via way of bleed inlet line 56.

As may also be seen in FIGS. 6 and 7, a repositionable pilot diaphragm 122 is provided to sealingly engage the seat 124 of bleed outlet 126 from the fluid reservoir 114. The pilot diaphragm 122 is displaceable by a plunger 128 between (a) a normally closed position, as shown in FIGS. 6 and 10, wherein the repositionable pilot diaphragm 122 sealingly engages the seat 124 to block escape of fluid through outlet conduit 130 (see FIG. 4 or 5) of pilot valve 52, and (b) an open position, wherein the repositionable pilot diaphragm 122 is displaced from the seat 124 so as to hydraulically open the pilot valve to allow passage of fluid through outlet 126 thereof, so that pressurized fluid from the pilot side 102 of the primary diaphragm chamber 94 is discharged through outlet conduit 130 of pilot valve 52. Normally, and preferably, pilot valve 52 is provided with a bleed outlet line 58, connected at a first end 127 with outlet conduit 130 and at a second end 129 to the outlet side 84 of primary valve 40, so that fluid is routed to outlet conduit 44 for use, rather than being wasted.

Figure 13:
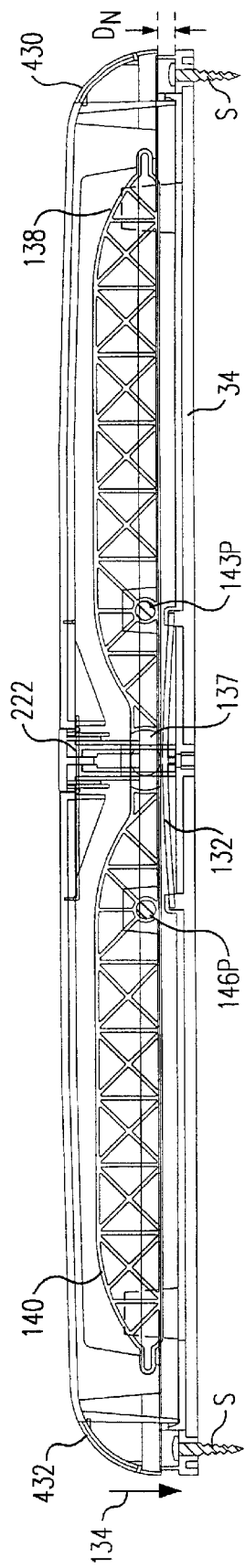
FIGS. 13, 14, 15, and 16 are four closely related views.
Figure 14:
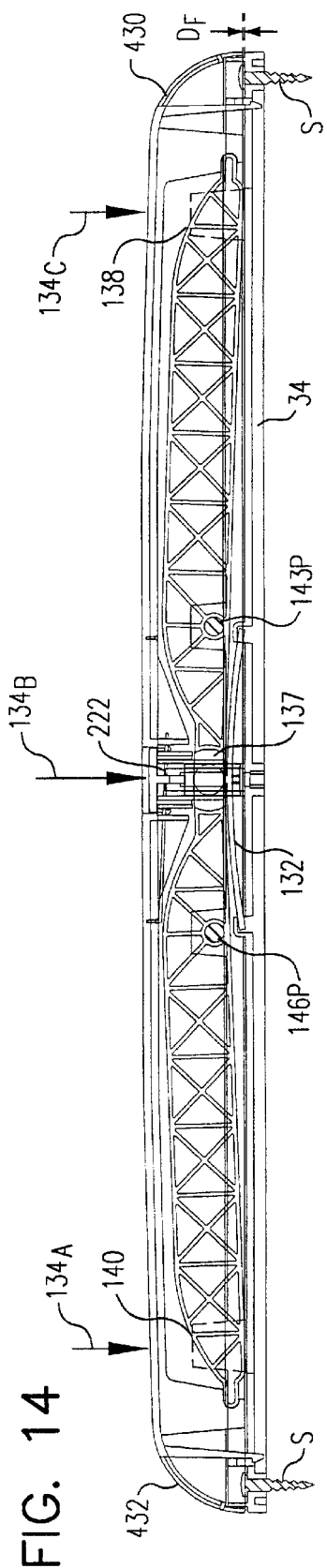
Figure 15:
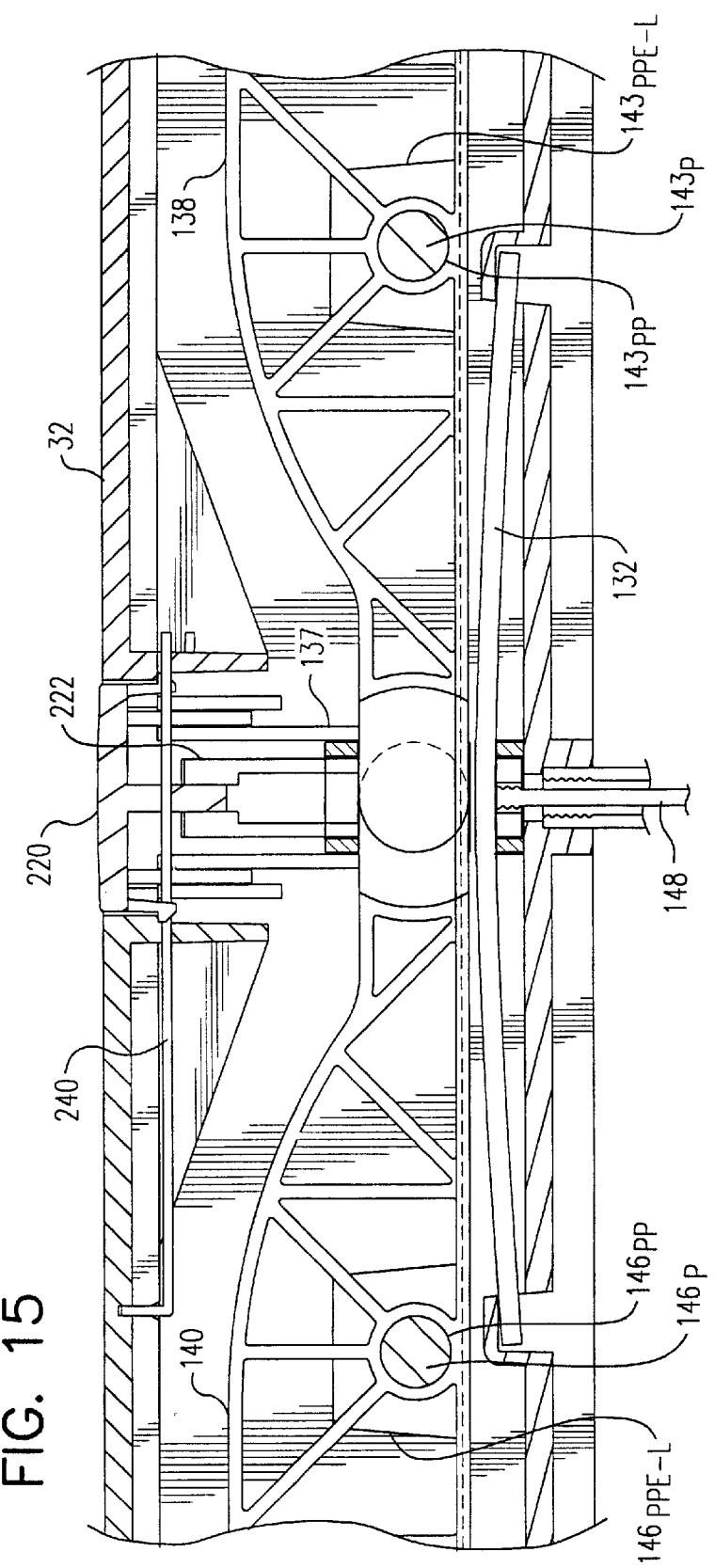
Figure 16:
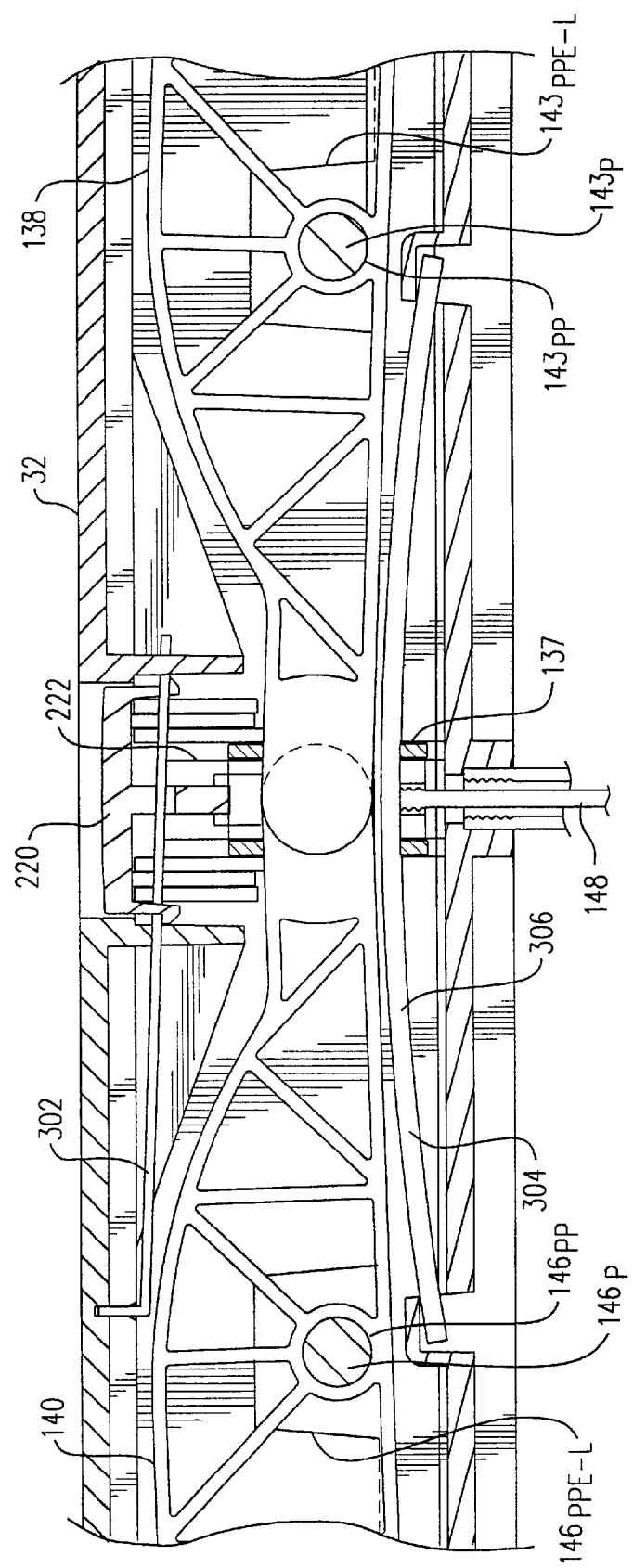

To operate pilot valve 52, an actuator push bar 32 is provided, preferably at the front 28 of wall 29 of cabinet 30, particularly when the valve apparatus is used in a kitchen or bathroom sink. The actuator 32 is preferably biased by spring 132 in the normally closed position, as shown in FIGS. 10, 13, and 15, and is manually depressed in the direction of reference arrow 134, as indicated in FIGS. 10 and 13, to reach an open position as depicted in FIGS. 11, 12, 14, and 16. Important internal actuator 32 components include pivot block 137, first pivot arm 138, and second pivot arm 140 (further seen in FIGS. 13, 14, 15, and 16 below). The first 137 and second 138 pivot arms react about pivot points $143_P$ and $146_P$ in response to outward movement of pivot block 137, which occurs in response to inward movement of actuator 32 (which relieves the tension exerted on pivot block 137 by spring 132). In this "reverse action" arrangement, the pivot arms 138 and 140 react at pivot pins $143_P$ and $146_P$ against pivot points $143_{PP}$ and $146_{PP}$, respectively (as better seen in FIGS. 3 and 3A above, where it is also noted that pivot pins $146_P$ and $143_P$ are preferably provided in cylindrical elements having upper $146_{P\text{-}U}$ and lower $146_{P\text{-}L}$ elements, and $143_{P\text{-}U}$ and $143_{P\text{-}L}$ elements, respectively, which extend above and below pivot arms 140 and 138, respectively) to interfit in matching upper pivot points $146_{PP\text{-}U}$ and lower $146_{PP\text{-}L}$ pivot points, located in pivot point ears $146_{PPE\text{-}U}$ and $146_{PPE\text{-}L}$, etc.) to resultingly manipulate pivot block 137 and pin 148 outwardly, so as to move plunger 128 of pilot valve 52 outwardly in the direction of reference arrow 150 in FIG. 4, to open pilot valve 52. The pivot block 137 is adapted to be moveable to the open position in response to movement of the actuator 32, so that upon repositioning of the actuator 32 to the open position, the operating pivot block 137 causes pin 148 to move outward, which causes the plunger 128 of the pilot valve 52 to reposition the pilot valve diaphragm 122 from a normally closed position to an open position. Collectively, this just mentioned mechanism is called linkage 136. When movement occurs to the open position, pressurized fluid contained by diaphragm 122 is released from the pilot side 102 of the primary diaphragm 96, causing the primary diaphragm 96 to move to the open position as shown in FIG. 11.

When the pilot valve 52 is returned to the closed position as set forth in FIGS. 6 and 10, a small portion of pressurized fluid from supply conduit 80 enters inlet space 78 and then passes through at least one weep passageway 152 in primary diaphragm 96 (see FIG. 9), as indicated by reference arrow 154 in FIG. 10. The weep passageway 152 is provided with sufficient size so that at least a small volume of pressurized fluid (adequate to exert sufficient pressure on the pilot side 98 of the primary diaphragm 96 to force the diaphragm 96 to sealingly contact seat 106 and thus close valve 40) is able to enter the pilot side 102 of the diaphragm chamber 94.

Structural details of the dual pilot valve 52 may be may be better seen in FIGS. 4, 5, 6, and 7. A main body 160 of dual pilot valve 52 is provided in a generally oval bathtub shape to accommodate two pilot valves 71 and 72. At the rear wall (or bottom) 162 of the body 160, a pair of preferably annular shaped recessed fluid receiving chambers 164 and 165 is provided. Protruding from the base B of chambers 164 and 165 are bleed exits 164B and 165B, respectively. Bleed outlet seal face raised ledges 166 and 167, preferably circular in shape, are provided in rear wall 162 with peripheral groves 168a and 168b around each of pilot valves 71 and 72 to receive a complementary raised edge seal 170a and 170b of the flexible dual pilot diaphragm 122. The preferably oval shaped dual pilot diaphragm 122 ideally fits snugly against the raised ledges 166 and 167 and extends laterally to the inner oval shaped wall 172 of dual pilot valve 72. Two recessed, preferably smooth, cymbal shaped recessed concave diaphragm seats 180 and 181 are provided in retainer 182 to accommodate individual pilot valve sections 183 and 184 of the dual pilot diaphragm 122. Individual posts 186 and 188 of plunger 128 fit snugly through apertures 190 and 192 of retainer 182 with sufficient length L (see FIG. 7) forward of the inside surface 194 of plunger 128' that posts 186 and 188 may each impinge upon the outside surface 196 of dual pilot diaphragm 122 so as to depress the inside surface 198 of pilot diaphragm 122 sealingly against the bleed inlet seals 124 and 125. As shown in FIGS. 6 and 7, plunger 128 is moved from its forward, normally closed position to a rearward, open position (as depicted in FIG. 7) via pin 148. Pin 148 is adapted for tight fitting sliding engagement in and being secured by hollow cylinder 200 which has a generally U-shaped circumferential groove 201 that is snap-fitted in complementary snap fit opening 202 in cap 204 of dual pilot valve 52.

Preferably, pin 148 includes a reaction pad 205 of greater surface area than that of pin 148 itself, in order to minimize stress on the outer side $128_O$ of plunger 128. The interior end 200, of cylinder 200 may include a shaped hollowed end (here, cone shaped) to accommodate the shape of the body of pin 148 behind reaction pad 205.

At the outer end $200_O$ of cylinder 200, threads $200_T$ are provided to connect the operably connected cylinder to complementary threads $34_T$ in mounting plate 34 (see FIGS. 10, 11, and 12). Pin 148 is located within a cylindrical threaded tube 200, which is secured at one end at the cap 204 of the dual pilot diaphragm valve 52, and at the other end at mounting plate 34 affixed to front 28 of cabinet wall 29.

By comparison of FIGS. 10 and 11, or between 13 and 14, or between 15 and 16, the movement of actuator 32 can be appreciated. When actuator 32 is pushed inward toward the front 28 of cabinet 30, linkage 136 (as described above) allows pin 148 to move outward, toward actuator 32'. Via way of pivot arms 138 and 140, acting against pivot pins $143_P$ and $146_P$, respectively, and release of force of spring 132, this retrograde motion configuration is achieved for operation of the novel valve apparatus. Moreover, the action achieved by this apparatus is such that even if pressure is applied unevenly to actuator 32, such as at either end of the same, by way of the forces distributed by the pivot arms 138 and 140, the actuator 32 is able to move relatively evenly toward the wall 28 of the cabinet 30. As seen in FIG. 10 or 13, when in a no-flow configuration, actuator 32 extends outward a distance DN from mounting housing 34. When in a flow configuration, actuator push bar 32 extends outward a distance DF from housing 34. As may be more evident by comparing FIGS. 10 and 11, I prefer a configuration where distance DF is small, and even approaching zero. Further, it is preferable that shroud 33 portion of mounting housing 34 completely spans the gap DN. In this fashion, fingers F (see FIG. 10) of a user's hand (shown in phantom lines) will not fall into a gap G between the inner end $32_I$ of actuator push bar 34 and the outer end $33_O$ of shroud 33 of the mounting housing 34.

Further evident in the just mentioned FIGS. 10 and 12 is a manual lock-on tab button 220 which can be utilized to maintain a "locked-on" flow condition, by locking the actuator 32 inward. To accomplish this function, spring 222 is provided for complementary mounting engagement about the upper and lower portions of pivot block 137, in an overall sideways and outwardly directed U-shaped configuration, where opposing upwardly directed tines 224 and downwardly directed tines 226 are situated for interfering engagement with upward and downward wedges $220_W$ of tab 220. In this manner, as can be seen by comparing FIG. 10 and FIG. 11, tines 224 and 226 are directed to catchment lands 230 and 232 in the upper inner $34_U$ and lower inner $34_L$ walls of actuator bar 34. When tab 220 is pressed inward, as shown in FIG. 12, then actuator bar 34 is secured in a stable state, on or liquid flow configuration. This configuration is secured by tab spring mechanism 222. When actuator bar 34 is returned to its normally off position (see FIG. 10), the wedge portions $220_W$ of tab 220 do not spread the tines 224 and 226 of spring 222 outward, and thus the tab 220 is not longer caught in a stable, locked flow position.

An alternate embodiment of the just described manual tab locking mechanism is provided in FIGS. 24, 26, 27, and 28. Here, an alternate spring mechanism 222' is shown attached to pivot block 137. The pivot block 137 captures pivot lever $138_L$ of the pivot arm 138, and the pivot lever $140_L$ of the pivot arm 140, for urging each of the just mentioned pivot levers in response to movement of the actuator bar 32, in the retrograde manner already described. Spring mechanism 222' includes a transverse portion $222_T$ that acts against catchment lands 230 in the upper inner $34_U$ wall of actuator bar 34. When tab 220 is pressed inward, as shown in FIG. 12, then actuator bar 34 is secured in a stable state, on or liquid flow configuration. This configuration is secured by tab spring mechanism 222'. When actuator bar 34 is returned to its normally off position (see FIG. 10), the wedge portions $220_W$ of tab 220 do not spread the transverse portion 222T of spring mechanism 222' outward, and thus the tab 220 is no longer caught in a stable, locked-on fluid flow position. Of course, the spring mechanism 222' could also be turned over and the lower lands 232 as earlier mentioned utilized, with the equivalent structure and same result.

Preferably, mounting housing 34 is provided in an elongate hollow open front configuration, in a size adapted to accept an elongated bar type actuator 32 at the front, using a shrouded, non-pinch configuration as earlier described. I prefer to utilize a generally rectangular shape for mounting housing 34, however, any convenient complementary and preferably nest-fitting type shapes may be utilized for actuator bar 32 and housing 34. Ideally, any gap G between the inner edge of actuator bar 32 and the outer stop surface $34_S$ of housing 34 is shrouded by a close fitting shroud 33 adapted to flush fit the interior periphery of actuator bar 32.

As can readily be appreciated by reference to FIGS. 4 and 10, the use of a circumferential groove or notch 201 near the distal end of the cylinder 200 holding the pin 148 allows the pilot valve 52 to be quickly and easily mounted into keyhole 202 shaped operating in cover 204 of the pilot valve 52, and thus secured in an operating position. This is particularly true where external threads $200_T$ are provided on the proximal end of the pin housing cylinder 200, so that the threads $200_T$ can be interfitted in firm meshing engagement with internal threads $34_T$ which define a through passageway aperture in mounting plate 34. In this fashion, pin-housing cylinder 200 allows caged, sliding, reversible passage of pin 148 therethough, and between the interior side $137_I$ of pivot block 137 and the exterior side $128_O$ of plunger 128. Ideally, as in the embodiment just described, the effective length of actuating pin 148 is carefully sized so that it provides a firm, repositionable, reliable device to operatively connect the actuator 32 with the plunger 128 of the pilot valve 52. However, other linking devices may be used to accomplish the same function and to achieve the same result, and so long as the linkage between manipulating an actuator is coupled with repositioning a pilot valve.

Figure 22:
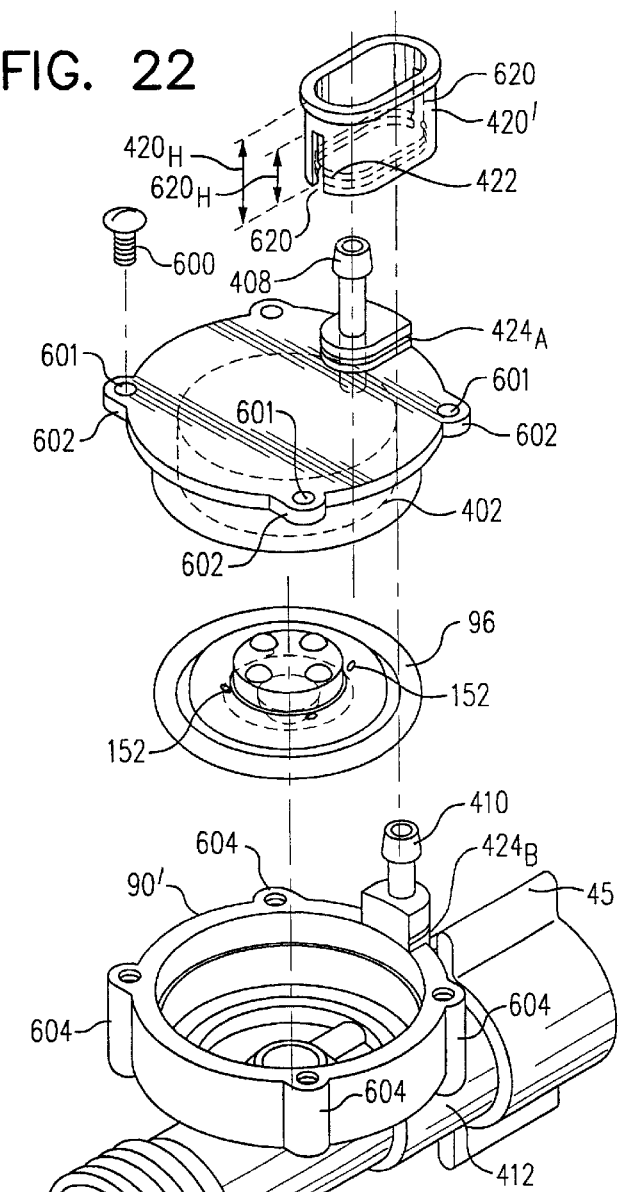
FIG. 22 is an exploded perspective view of a main valve for controlling water flow, showing the various elements of the valve including the main body with fastener accepting apertures, a diaphragm seat, a diaphragm seat, upper housing with guide ears having an aperture therethrough for accepting a fastener, a pilot inlet portion with base having a slot recess portion, and a pilot outlet portion with base having a slot recess portion, and a snap-on barb shroud or protector with side slot and lower lip for protecting the barbed pilot inlet and outlet conduit connectors.

Further details of the primary or diaphragm valve is also illustrated in FIG. 8. Valve 40 has leading thereto a fluid supply portion 380. Threads 400 on valve 40 are provided for connection to inlet line 42 (to provide a pressurized fluid supply line). A monolithic block main body 402 is provided. Diaphragm seat 106 is provided, against which primary diaphragm 96 sealingly engages. Diaphragm housing 90 and monolithic block main body 402 of primary valve 40 combine to form therebetween a diaphragm chamber 94, as described herein above with regard to valve 40. Although the diaphragm housing 90 and main body 402 are may be permanently secured together for leakless construction, an alternate embodiment is shown in FIG. 22, where the use of fasteners 600 is shown fitting through apertures 601 in ears 602 and into threaded receivers 604 integrally provided with the diaphagm chamber 90'. In both FIG. 22 and FIG. 8, a bleed nipple 408 is shown provided in main body 402. A bleed discharge nipple 410 is provided on the outlet line 412 of valve, so that bleed fluid can be discharged into outlet line 412. Wingnuts 45 are provide on the threaded outlet coupling 82. Importantly, an oval shaped, protective barb shroud 420 with interior protruding bead 422 for snap-fit to exterior circumferential groove 424 (including groove portions $424_A$ and $424_B$, as shown) in order to provide a protective cover for the inlet and outlet bleed fitting barbs 408 and 410. An alternate embodiment is shown in FIG. 22, where the use of one or more slots, 620, preferably axially extending for a height $620_H$ at least a portion of the total height $420_H$ of the barb shroud 420. In FIG. 22, the use of opposing slots 620 at first and second ends of barb shroud are provided. Importantly, the slots allow flexibility in the walls of shroud 420, so that an effective amount of inward compression can be exerted at inward protruding bead 422 to secure the barb shroud at grooves 424. By reference to FIGS. 18 and 19, this embodiment can be seen, and reference arrows 624 shown how the barb shroud housing is outwardly displaced when the split barb type housing is affixed to an interference fit groove for firm mating engagement.

Turning now to FIG. 17 another embodiment of a workable pilot operated water regulating valve apparatus is provided. Here, as seen looking up from below the valves when installed in conventional US fashion with hot water on the left hand side of the user, a primary regulating valve 500 is used on the hot water line, and a primary valve 502 is used on the cold water line. A single housing is provided for a dual pilot valve 52 that is positioned adjacent to, and just inside the back 520 of cabinet wall 522. On the front 524 of cabinet wall 522 is mounted an actuator mount housing base 34. An actuator push bar 32 is provided to actuate the dual pilot valve 52 via linkage mechanism 54. Coiled expandable flexible interconnecting lines 530 and 532 are provided for hot water valve 500 and cold-water valve 502 actuation, respectively. And, the alternate embodiment of removable, snap on barb protectors (also called barb shrouds) 420' is provided. A small barb protector 420' is provided to protect inlet and outlet barbs In FIG. 20 a vertical cross-sectional view of a second embodiment of a retainer 182' as illustrated in FIG. 21 is provided, taken across line 20—20 of FIG. 21. This view illustrates the cymbal shaped recesses 181 for accepting a diaphragm 198 during valve operation.

FIG. 21 provides an exploded perspective view of yet another embodiment of a dual pilot valve, similar to the valve first shown in FIG. 4, showing internal components and assembly details of the pilot valve 52, including the main body, the diaphragm seat, the shaped (here, roughly FIG. 8 shaped) diaphragm 198' with sealing lip 199, and having an edge contour to avoid interference with fasteners 640. Also illustrated are a U-bar shaped metallic (or other stiff, resilient material) plunger, a retainer without central plunger clearance passageway (compare FIGS. 21 and 4). Also, an outer housing cover is shown with key way passage lock 202 for slot 210 of cylinder 200 holding the actuator pin 148. Additionally, when necessary, closure devices, including fasteners 640 with matching threaded insert receivers 642 are provided. Also, the use of pins 644 that use interference fit into apertures 648, or which can be thermally secured thereto, may be utilized.

Figure 23:
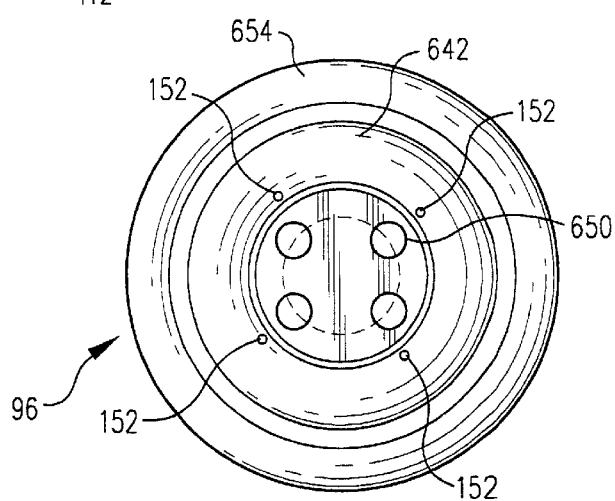
FIG. 23 is a top view of a diaphragm for the main valve just illustrated in FIG. 22, showing the integral weep holes, upper cushioning stop knobs, flexible ring expansion portion, and an outer securing ring used to affix the diaphragm in the main valve.
Figure 25:
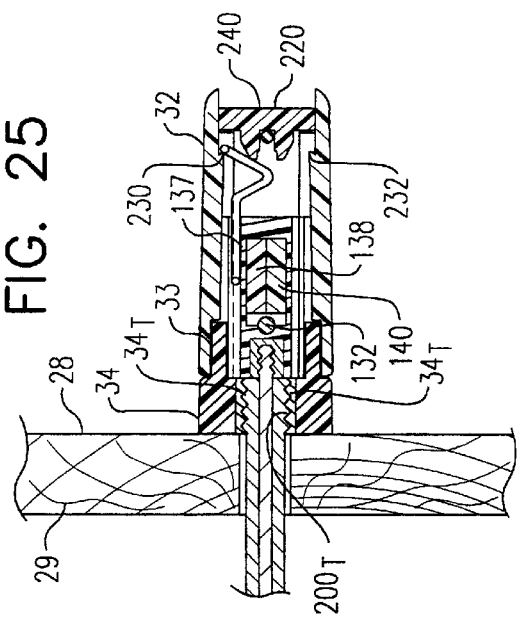
FIG. 25 is a cross-sectional view of a flush mount, no pinch point type actuation push bar in its operative position, similar to FIG. 12 above, shown in the engaged, water flow position wherein the push bar is engaged toward the cabinet face, and showing the improved spring mechanism securing the manual tab in an on, water flow position.

In FIG. 23 is a top view of a diaphragm 96 for the main valve just illustrated in FIG. 22, showing the use of four integral weep holes 152, and upper cushioning stop knobs 650, flexible ring expansion portion 652, and an outer securing ring 654 used to affix the diaphragm in the main valve.

Figure 24:
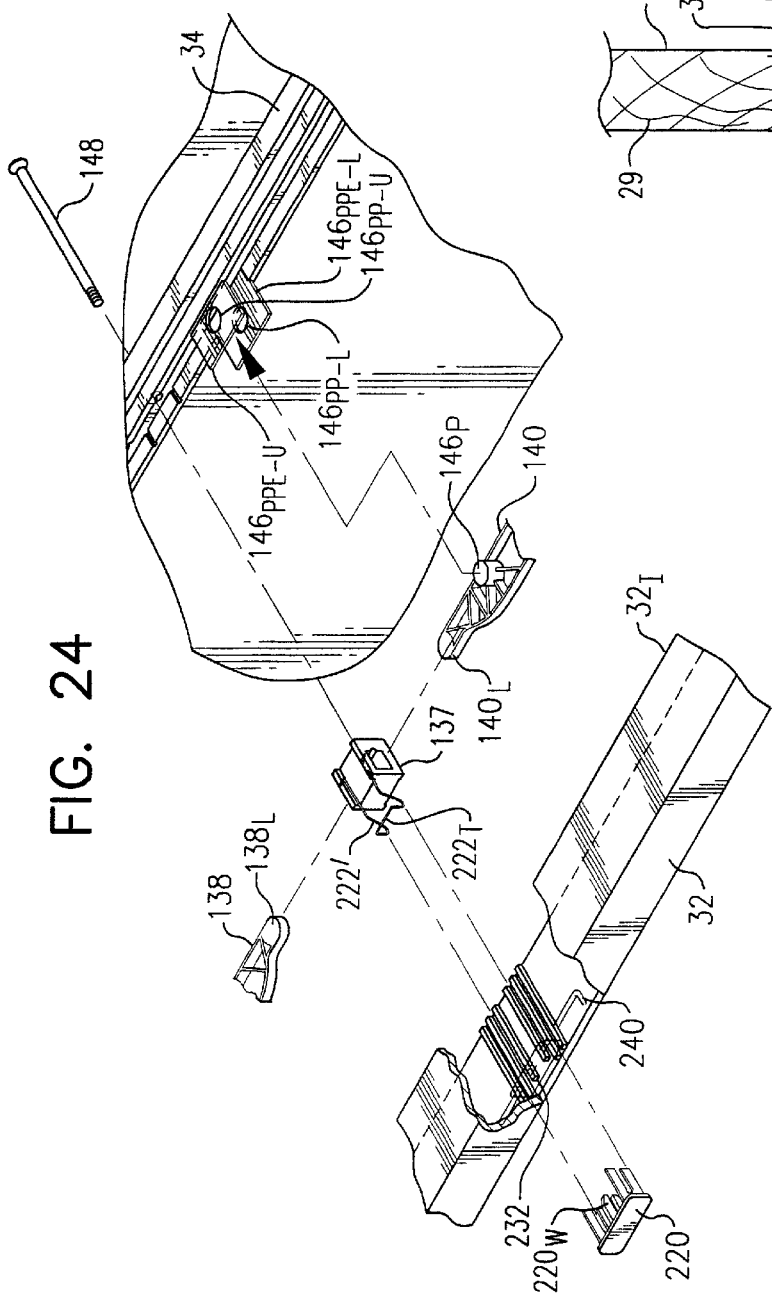
FIG. 24 is a partial perspective view similar to FIG. 3 above, showing a mounting bar and a close fitting actuator push bar, a front "lock-on" button, showing a centrally mounted moving pivot block with improved spring mechanism, as well as pivot point ears of the pivot arms which fit into, and are moved by, the pivot block.
Figure 26:
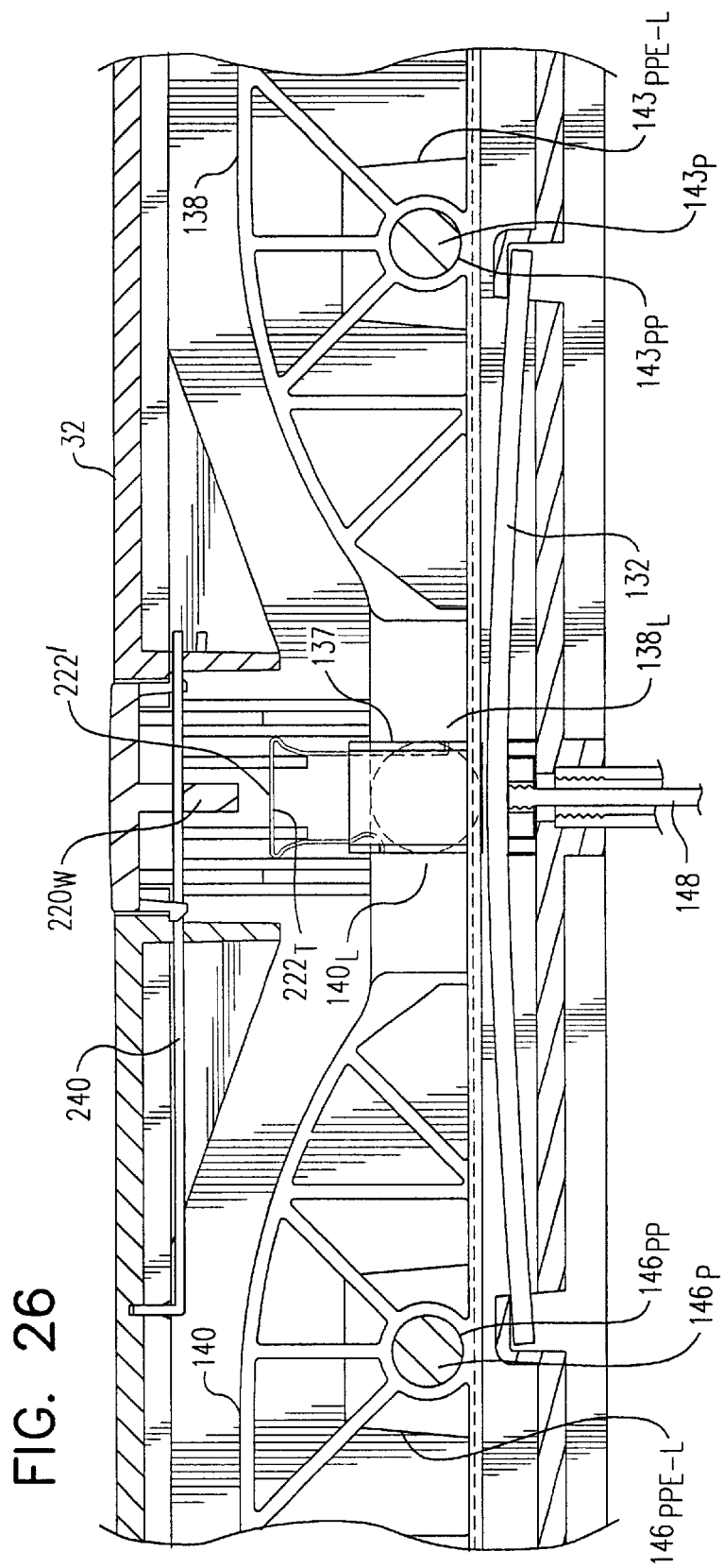
Figure 27:
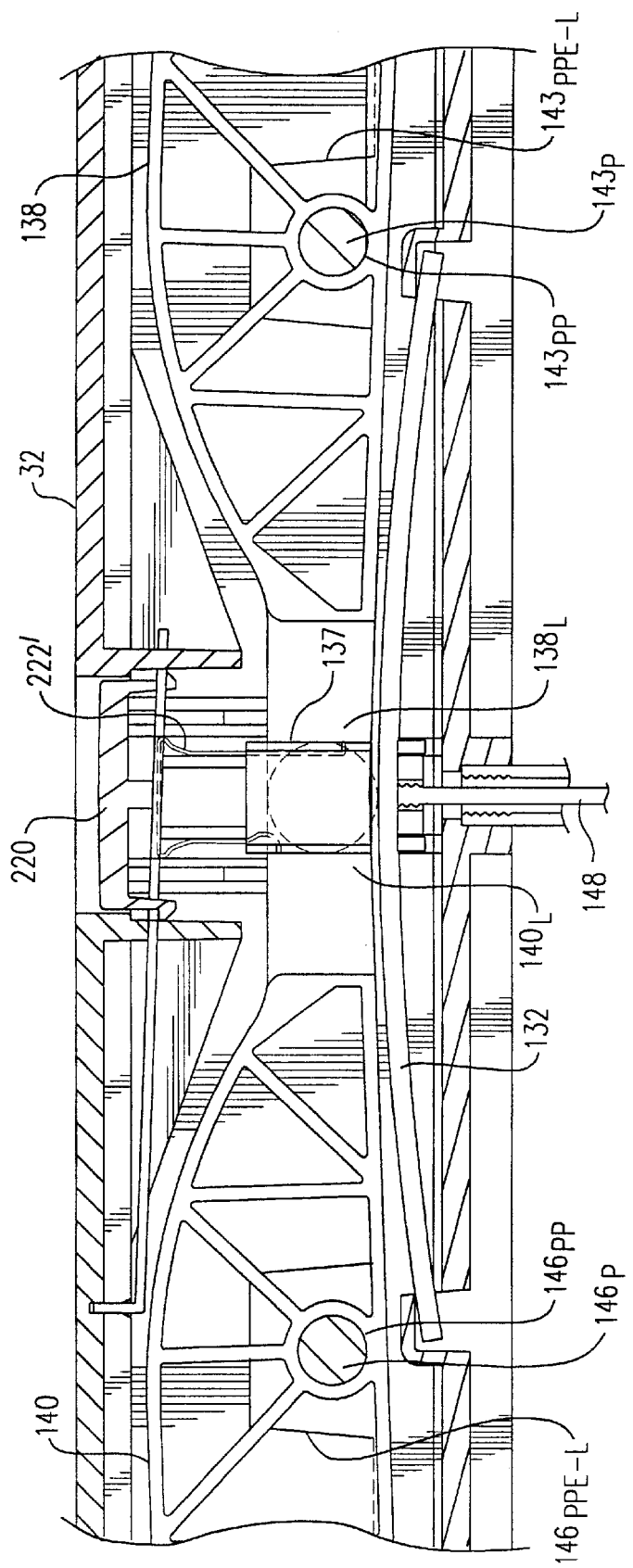

FIG. 24 is a partial perspective view similar to FIG. 3 above, showing a mounting bar 34 and a close fitting actuator push bar 32. The front manual "lock-on" button is shown interfacing with a centrally mounted moving pivot block 137 with improved spring mechanism 222', as well as pivot point ears 138L and 140L of the pivot arms 138 and 140 which fit into, and are moved by, the pivot block 137.

It is to be appreciated that the novel valve apparatus and method for regulating the flow of water from a tap which is provided is a significant improvement in the state of the art of water saving devices for use in pressurized water supply systems such as industrial, commercial, and household kitchen and bathroom sinks. The novel valve apparatus disclosed herein is relatively simple, and it substantially decreases the cost and complexity involved in installing water saving valves in existing home sinks. Although only a few exemplary embodiments have been described in detail, it will be readily apparent to those skilled in the art that the novel valve apparatus and method of employing the same may be modified from those embodiments provided herein without materially departing from the novel teachings and advantages provided, and may be embodied in other specific forms without departing from the spirit or essential characteristics thereof. Also, it is to be noted that while only one (the hot primary valve) of the pair of primary valves was described in detail, the virtually identical operation of the second (cold primary valve) will be easily understood by those of ordinary skill in the art and to which this disclosure is directed. Although only a few exemplary embodiments have been described in detail, various details are sufficiently set forth in the drawings and in the specification provided herein to enable one of ordinary skill in the art to make and use the invention(s), which need not be further described by additional writing in this detailed description. Importantly, the aspects and embodiments described and claimed herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s), as set forth in the appended claims, and as indicated by the drawing and by the foregoing description, is intended to include variations from the embodiments provided which are nevertheless described by the broad interpretation and range properly afforded to the plain meaning of the claims set forth below.

What is claimed is:

1. An actuator for mounting on a substrate for manual operation of a link to a device connected to said actuator, said actuator comprising
    (a) and elongated, fixed housing portion, said fixed housing portion securable to said substrate in a fixed position, and
    (b) a moving push bar portion, said push bar portion having a first end and a second end,
    (c) opposing pivot arms linking said fixed housing and said moving push bar portion, each of said opposing pivot arms acting against fixed pivot points to distribute actuating force to both the first end and to the second end of said moving push bar portion;
    (d) so that said push bar portion reliably and uniformly moves toward said fixed housing at substantially equally rates at said first end and at said second end, in response to actuating force at any longitudinal location between said first and said second end; and
    (e) wherein said fixed housing portion and said moving push bar portion are provided in a closely fitting inter-engaging and overlapping fashion, so that a gap G is avoided between said fixed housing portion and said push bar portion, characterized in that a finger pinch point is avoided between said fixed housing portion and said push bar portion.

2. The actuator as set forth in claim 1, wherein said each of said opposing pivot arms further act about a mutual pivot point centrally located longitudinally along said actuator bar.

3. The actuator as set forth in claim 1, wherein said actuator provides for retrograde motion of said link, so that when said actuator is pushed inward, said link is pulled outward.

4. The actuator as set forth in claim 1, wherein said first end and said second end of said actuator bar comprises a smooth, radiused end portion.

5. The actuator bar as set forth in claim 4, wherein said radiused end portion further comprises an access cover said access cover adapted to allow access to said fixed housing portion for setting a mounting screw.

6. The actuator bar as set forth in claim 5, wherein said access cover comprises a snap-on mount.

7. The actuator bar as set forth in claim 1, further comprising a manual is lock tab, said tab displaceable between an no fluid flow position and a locked, fluid flow position, and displaceable from a fluid flow position to a non fluid flow position by inward pressure on said actuator.

8. The actuator bar as set forth in claim 7, further comprising a spring mechanism, and wherein said actuator bar further comprises one or more catchment lands, wherein said spring mechanism latches against said catchment lands to lock said tab lock in said fluid flow position.

9. The actuator bar as set forth in claim 8, wherein said spring mechanism comprises a transverse portion, and wherein said transverse portion acts on said catchment lands.

10. The actuator bar as set forth in claim 1, further comprising a pivot block responsive to said opposing pivot arms, and wherein said pivot block provides retrograde motion in response to inward movement of said actuator bar.

11. A valve apparatus for control flow of fluid discharge from a pressurized fluid distribution system, where said valve apparatus is supplied with fluid via an incoming conduit supplying the fluid under pressure, said valve apparatus comprising:
    (a) a primary valve, said primary valve comprising
        (i) an inlet, said inlet adapted to receive said fluid under pressure from said incoming conduit,
        (ii) an outlet, said outlet adapted to discharge said fluid to an outlet conduit;
        (iii) a diaphragm chamber, said chamber having a pilot portion and a working portion;
        (iv) a fluid pressure controlled primary diaphragm, said primary diaphragm located in said primary diaphragm chamber between said pilot portion and said working portion of said primary diaphragm chamber, said primary diaphragm having a pilot side and a working side, said working side of said primary diaphragm configured to engage
            (A) at least a portion of said inlet, and
            (B) said outlet,
        (v) and wherein said primary diaphragm is adapted to be responsive to fluid pressure to move between
            (A) an open position wherein fluid pressure from said inlet disengages said primary diaphragm from said outlet so that fluid is allowed from said inlet to said outlet and thence to outlet conduit; and
            (B) a closed position, wherein fluid pressure on said pilot side of said primary diaphragm forces said primary diaphragm to sealingly engage said outlet so that fluid is not allowed from said inlet to said outlet;
    (b) a bleed inlet line, said bleed inlet line having a first end and a second end, said first end hydraulically connected to said pilot portion of said primary diaphragm chamber;
    (c) a pilot valve, said pilot valve having
        (i) a bleed inlet, said bleed inlet hydraulically connected to said second end of said bleed inlet line from said pilot portion of said diaphragm chamber,
        (ii) a bleed outlet,
        (iii) a pressurizable fluid reservoir, said fluid reservoir located between said bleed inlet and said bleed outlet, said fluid reservoir adapted to receive pressurized liquid from said bleed inlet line;
        (iv) a repositionable pilot diaphragm;
        (v) a plunger, said plunger adapted to displace said repositionable pilot diaphragm between
            (A) a normally closed position wherein said repositionable pilot diaphragm sealingly engages said bleed outlet to block escape of said pressurized fluid through said pilot valve, and
            (B) an open position, wherein said repositionable pilot diaphragm is displaced from said bleed outlet so as to open said bleed outlet for passage of fluid therethrough, so that said pressurized fluid from said pilot side of said primary diaphragm chamber is discharged through said pilot valve;
(d) wherein each of said pilot valves further comprises
(1) a body, said body cooperating with an interior rear wall to form a recessed fluid receiving chamber,
(2) a plunger said plunger comprising two or more posts of length L,
(3) a retainer, said retainer having two or more aperture defining edges complementary to said two or more posts of said plunger, and wherein said plunger may be actuated to depress said diaphram seat against said diaphram seal seats, so as to sealingly interrupt fluid flow through said pilot valve;
(e) an actuator, said actuator having an open position and a normally closed position, said actuator further comprising an operating link connected with said pilot valve, said actuator adapted to be moveable to the open position in response to movement of said actuator, so that upon repositioning of said actuator to said open position, said operating link causes the plunger of said pilot valve to reposition said pilot valve diaphragm from a normally closed position to an open position, thereby effecting the release of pressurized fluid out the bleed outlet and releasing fluid pressure on said pilot side of said primary diaphragm, to thereby cause said primary diaphragm to move to said open position; and
(f) an actuator housing, said actuator housing generally in an elongated, rectangular shape having a frontal opening, said frontal opening adapted to fit therein in operational cooperation with said plunger with minimal peripheral gap between said actuator and said actuator housing.

12. A valve apparatus for control flow of fluid discharge from a pressurized fluid distribution system, where said valve apparatus is supplied with fluid via an incoming conduit supplying the fluid under pressure, said valve apparatus comprising:
(a) a primary valve, said primary valve comprising
(i) an inlet, said inlet adapted to receive said fluid under pressure from said incoming conduit,
(ii) an outlet, said outlet adapted to discharge said fluid to an outlet conduit;
(iii) a diaphragm chamber, said chamber having a pilot portion and a working portion;
(iv) a fluid pressure controlled primary diaphragm, said primary diaphragm located in said primary diaphragm chamber between said pilot portion and said working portion of said primary diaphragm chamber, said primary diaphragm having a pilot side and a working side, said working side of said primary diaphragm configured to engage
(A) at least a portion of said inlet, and
(B) said outlet,
(v) and wherein said primary diaphragm is adapted to be responsive to fluid pressure to move between
(A) an open position wherein fluid pressure from said inlet disengages said primary diaphragm from said outlet so that fluid is allowed from said inlet to said outlet and thence to outlet conduit; and
(B) a closed position, wherein fluid pressure on said pilot side of said primary diaphragm forces said primary diaphragm to sealingly engage said outlet so that fluid is not allowed from said inlet to said outlet;
(b) a bleed inlet line, said bleed inlet line having a first end and a second end, said first end hydraulically connected to said pilot portion of said primary diaphragm chamber;
(c) a pilot valve, said pilot valve having
(i) a bleed inlet, said bleed inlet hydraulically connected to said second end of said bleed inlet line from said pilot portion of said diaphragm chamber,
(ii) a bleed outlet,
(iii) a pressurizable fluid reservoir, said fluid reservoir located between said bleed inlet and said bleed outlet, said fluid reservoir adapted to receive pressurized liquid from said bleed inlet line;
(iv) a repositionable pilot diaphragm, said diaphram adapted to be repositionable pilot diaphragm between
(A) a normally closed position wherein said repositionable pilot diaphragm sealingly engages said bleed outlet to block escape of said pressurized fluid through said pilot valve, and
(B) an open position, wherein said repositionable pilot pilot diaphragm is displaced from said bleed outlet so as to open said bleed outlet for passage of fluid therethrough, so that said pressurized fluid from said pilot side of said primary diaphragm chamber is discharged through said pilot valve; and
(d) wherein said pilot valve further comprises
(1) a body, said body cooperating with an interior rear wall to form a recessed fluid receiving chamber,
(2) a plunger said plunger comprising two or more posts of length L,
(3) a retainer, said retainer having two or more aperture defining edges complementary to said two or more posts of said plunger, and wherein said plunger may be actuated to depress said diaphram seal against said diaphram seal seats, so as to sealingly interrupt fluid flow through said pilot valve;
(e) an actuator, said actuator having an open position and a normally closed position, said actuator further comprising an operatively connected link with said pilot valve, said actuator adapted to be moveable to the open position in response to movement of said actuator, so that upon repositioning of said actuator to said open position, said operatively connected link causes said repositionable pilot diaphram to reposition said pilot valve diaphragm from a normally closed position to an open position, thereby effecting the release of pressurized fluid out the bleed outlet and releasing fluid pressure on said pilot side of said primary diaphragm, to thereby cause said primary diaphragm to move to said open position; and
(f) an actuator housing, said actuator housing generally in an elongated, rectangular shape having a frontal opening, said frontal opening adapted to fit therein in operational cooperation with said plunger with minimal peripheral gap between said actuator and said actuator housing.

13. A valve apparatus for operator control flow of two or more different fluid streams discharged from a tap, where the tap receives fluid discharged from said valve apparatus, and where said valve apparatus is provided with the two or more fluids fluid via separate incoming conduits for the supply of each of the fluids under pressure in its separate conduit, said control apparatus comprising:
(a) two or more primary valves, said two or more primary valves each comprising
(i) an inlet, said inlet adapted to receive said fluid under pressure from one of said two or more incoming conduits,
(ii) an outlet, said outlet adapted to discharge said fluid through a discharge conduit to said tap;

(iii) a diaphragm chamber, said chamber having a pilot portion and a working portion;
(iv) a fluid pressure controlled primary diaphragm, said primary diaphragm located in said primary diaphragm chamber between said pilot portion and said working portion of said primary diaphragm chamber, said primary diaphragm having a pilot side and a working side, said working side of said primary diaphragm configured to engage
  (A) at least a portion of said inlet, and
  (B) said outlet,
(v) and wherein said primary diaphragm is adapted to be responsive to fluid pressure to move between
  (A) an open position wherein fluid pressure from said inlet disengages said primary diaphragm from said outlet so that fluid is allowed from said inlet to said outlet and thence to said tap, and
  (B) a closed position, wherein fluid pressure on said pilot side of said primary diaphragm forces said primary diaphragm to sealingly engage said outlet so that fluid is not allowed from said inlet to said outlet;
(b) two or more bleed inlet lines, each of said bleed inlet lines having a first end and a second end, said first end hydraulically connected to said pilot portion of said primary diaphragm chamber;
(c) two or more pilot valves, each of said two or more pilot valves having
  (i) a bleed inlet, said bleed inlet hydraulically connected to said second end of said bleed inlet line from said pilot portion of said diaphragm chamber,
  (ii) a bleed outlet,
  (iii) a pressurizable fluid reservoir, said fluid reservoir located between said bleed inlet and said bleed outlet, said fluid reservoir adapted to receive pressurized liquid from said bleed inlet line;
  (iv) a repositionable pilot diaphragm;
  (v) a plunger, said plunger adapted to displace said repositionable pilot diaphragm between
    (A) a normally closed position wherein said repositionable pilot diaphragm sealingly engages said bleed outlet to block escape of said pressurized fluid through said pilot valve, and
    (B) an open position, wherein said repositionable pilot pilot diaphragm is displaced from said bleed outlet so as to open said bleed outlet for passage of fluid therethrough, so that said pressurized fluid from said pilot side of said primary diaphragm chamber is discharged through said pilot valve; and
(d) wherein each of said pilot valve further comprises
  (1) a body, said body cooperating with an interior rear wall to form a recessed fluid receiving chamber,
  (2) a plunger said plunger comprising two or more posts of length L,
  (3) a retainer, said retainer having two or more aperture defining edges complementary to said two or more posts of said plunger, and wherein said plunger may be actuated to depress said diaphram seal against said diaphram seal seats, so as to sealingly interrupt fluid flow through said pilot valve;
(e) an actuator, said actuator having an open position and a closed position, said actuator further comprising an operating link connected with said two or more pilot valves, said actuator adapted to be responsive to input of an operator, so that upon repositioning of said actuator by an operator, operating link acts upon the plunger of said two or more pilot valves, to thereby reposition each of said two or more said pilot valve diaphragms from a normally closed position to an open position, thereby effecting the release of fluid pressure on each of said two or more said primary diaphrams, to thereby cause each of said two or more primary diaphrams to move to said open position; and
(f) an actuator housing, said actuator housing generally in an elongated, rectangular shape having a frontal opening, said frontal opening adapted to fit therein in operational cooperation with said plunger with minimal peripheral gap between said actuator and said actuator housing.

* * * * *